(12) United States Patent
Chui et al.

(10) Patent No.: US 12,530,860 B2
(45) Date of Patent: Jan. 20, 2026

(54) SYSTEMS AND METHODS FOR USING AI TO IDENTIFY REGIONS OF INTEREST IN MEDICAL IMAGES

(71) Applicant: Hologic, Inc., Marlborough, MA (US)

(72) Inventors: Haili Chui, Santa Clara, CA (US); Nikolaos Gkanatsios, Danbury, CT (US); Zhenxue Jing, Marlborough, MA (US); Ashwini Kshirsagar, Santa Clara, CA (US); Samir Parikh, Bethel, CT (US); Venkateswara Vaddineni, San Jose, CA (US)

(73) Assignee: Hologic, Inc., Marlborough, MA (US)

( * ) Notice: Subject to any disclaimer, the term of this patent is extended or adjusted under 35 U.S.C. 154(b) by 429 days.

(21) Appl. No.: 17/532,286

(22) Filed: Nov. 22, 2021

(65) Prior Publication Data

US 2022/0164586 A1 May 26, 2022

Related U.S. Application Data

(60) Provisional application No. 63/116,162, filed on Nov. 20, 2020.

(51) Int. Cl.
*G06V 10/00* (2022.01)
*G06F 18/21* (2023.01)
(Continued)

(52) U.S. Cl.
CPC ............ *G06V 10/22* (2022.01); *G06F 18/214* (2023.01); *G06F 18/217* (2023.01);
(Continued)

(58) Field of Classification Search
CPC ...... G06V 10/22; G06V 10/25; G06V 10/774; G06V 10/94; G06V 2201/03;
(Continued)

(56) References Cited

U.S. PATENT DOCUMENTS 3,502,878 A 3/1970 Stewart
3,863,073 A 1/1975 Wagner
(Continued)

FOREIGN PATENT DOCUMENTS

AU 2014339982 4/2015
CN 1640209 A 7/2005
(Continued)

OTHER PUBLICATIONS

Bouget, David, et al., "Vision-based and marker-less surgical tool detection and tracking: a review of the literature", Medical Image Analysis, published Sep. 13, 2016, DOI:https://doi.org/10.1016/j.media.2016.09.003, 29 pages.

(Continued)

*Primary Examiner* — Van D Huynh
(74) *Attorney, Agent, or Firm* — Merchant & Gould P.C.

(57) ABSTRACT

Examples of the present disclosure describe systems and methods for using AI to identify regions of interest (ROI) in medical images. In aspects, medical reports and images may be provided to a second environment. The second environment may use the medical report data/medical images to train a natural language processing (NLP)-based algorithm to identify the location in images of ROI described in the medical report data. The output of the NLP-based algorithm may be stored in an ROI repository in the second environment. After the NLP-based algorithm has been trained, a request to train a user-specific model may be received in a first environment. Data objects for the requested user-specific model may be provided to the second environment, which uses the ROI repository to train the model. The trained model may be provided to the first environment, where the trained user-specific model/algorithm may be tested and stored.

13 Claims, 5 Drawing Sheets

(51) Int. Cl.
*G06F 18/214* (2023.01)
*G06F 21/62* (2013.01)
*G06F 40/40* (2020.01)
*G06T 7/00* (2017.01)
*G06T 7/11* (2017.01)
*G06V 10/22* (2022.01)

(52) U.S. Cl.
CPC .......... *G06F 21/6245* (2013.01); *G06F 40/40* (2020.01); *G06T 7/0012* (2013.01); *G06T 7/11* (2017.01); *G06T 2207/30068* (2013.01)

(58) Field of Classification Search
CPC .. G06F 18/214; G06F 18/217; G06F 21/6245; G06F 40/40; G06F 40/211; G06F 40/279; G06F 40/30; G06T 7/0012; G06T 7/11; G06T 2207/30068; G16H 30/40
See application file for complete search history.

(56) References Cited

U.S. PATENT DOCUMENTS

| | | |
|---|---|---|
| 3,908,293 A | 9/1975 | Newman |
| 3,971,950 A | 7/1976 | Evans |
| 4,160,906 A | 7/1979 | Daniels |
| 4,310,766 A | 1/1982 | Finkenzeller et al. |
| 4,496,557 A | 1/1985 | Malen et al. |
| 4,559,641 A | 12/1985 | Caugant et al. |
| 4,706,269 A | 11/1987 | Reina et al. |
| 4,744,099 A | 5/1988 | Huettenrauch |
| 4,773,086 A | 9/1988 | Fujita |
| 4,773,087 A | 9/1988 | Plewes |
| 4,819,258 A | 4/1989 | Kleinman et al. |
| 4,821,727 A | 4/1989 | Levene et al. |
| 4,907,156 A | 3/1990 | Doi et al. |
| 4,969,174 A | 11/1990 | Schied |
| 4,989,227 A | 1/1991 | Tirelli et al. |
| 5,018,176 A | 5/1991 | Romeas et al. |
| RE33,634 E | 7/1991 | Yanaki |
| 5,029,193 A | 7/1991 | Saffer |
| 5,051,904 A | 9/1991 | Griffith |
| 5,078,142 A | 1/1992 | Siczek et al. |
| 5,099,846 A | 3/1992 | Hardy |
| 5,129,911 A | 7/1992 | Siczek et al. |
| 5,133,020 A | 7/1992 | Giger et al. |
| 5,163,075 A | 11/1992 | Lubinsky |
| 5,164,976 A | 11/1992 | Scheid et al. |
| 5,199,056 A | 3/1993 | Darrah |
| 5,219,351 A | 6/1993 | Teubner |
| 5,220,867 A | 6/1993 | Carpenter |
| 5,240,011 A | 8/1993 | Assa |
| 5,279,309 A | 1/1994 | Taylor et al. |
| 5,280,427 A | 1/1994 | Magnusson |
| 5,289,374 A | 2/1994 | Doi |
| 5,289,520 A | 2/1994 | Pellegrino et al. |
| 5,343,390 A | 8/1994 | Doi et al. |
| 5,359,637 A | 10/1994 | Webbe |
| 5,365,562 A | 11/1994 | Toker |
| 5,386,447 A | 1/1995 | Siczek |
| 5,415,169 A | 5/1995 | Siczek et al. |
| 5,426,685 A | 6/1995 | Pellegrino et al. |
| 5,452,367 A | 9/1995 | Bick |
| 5,474,072 A | 12/1995 | Schmulewitz |
| 5,479,603 A | 12/1995 | Stone |
| 5,491,627 A | 2/1996 | Zhang et al. |
| 5,495,576 A | 2/1996 | Ritchey |
| 5,499,097 A | 3/1996 | Ortyn et al. |
| 5,506,877 A | 4/1996 | Niklason et al. |
| 5,526,394 A | 6/1996 | Siczek |
| 5,537,485 A | 7/1996 | Nishikawa |
| 5,539,797 A | 7/1996 | Heidsieck et al. |
| 5,553,111 A | 9/1996 | Moore |
| 5,592,562 A | 1/1997 | Rooks |
| 5,594,769 A | 1/1997 | Pellegrino et al. |
| 5,596,200 A | 1/1997 | Sharma |
| 5,598,454 A | 1/1997 | Franetzki |
| 5,609,152 A | 3/1997 | Pellegrino et al. |
| 5,627,869 A | 5/1997 | Andrew et al. |
| 5,642,433 A | 6/1997 | Lee et al. |
| 5,642,441 A | 6/1997 | Riley et al. |
| 5,647,025 A | 7/1997 | Frost et al. |
| 5,657,362 A | 8/1997 | Giger |
| 5,668,889 A | 9/1997 | Hara |
| 5,671,288 A | 9/1997 | Wilhelm et al. |
| 5,712,890 A | 1/1998 | Spivey |
| 5,719,952 A | 2/1998 | Rooks |
| 5,729,471 A | 3/1998 | Jain |
| 5,735,264 A | 4/1998 | Siczek et al. |
| 5,763,871 A | 6/1998 | Ortyn et al. |
| 5,769,086 A | 6/1998 | Ritchart et al. |
| 5,773,832 A | 6/1998 | Sayed et al. |
| 5,803,912 A | 9/1998 | Siczek et al. |
| 5,818,898 A | 10/1998 | Tsukamoto et al. |
| 5,828,722 A | 10/1998 | Ploetz |
| 5,835,079 A | 11/1998 | Shieh |
| 5,841,124 A | 11/1998 | Ortyn et al. |
| 5,851,180 A | 12/1998 | Crosby |
| 5,872,828 A | 2/1999 | Niklason et al. |
| 5,875,258 A | 2/1999 | Ortyn et al. |
| 5,878,104 A | 3/1999 | Ploetz |
| 5,878,746 A | 3/1999 | Lemelson et al. |
| 5,896,437 A | 4/1999 | Ploetz |
| 5,941,832 A | 8/1999 | Tumey |
| 5,954,650 A | 9/1999 | Saito |
| 5,986,662 A | 11/1999 | Argiro |
| 5,999,662 A | 12/1999 | Burt |
| 6,005,907 A | 12/1999 | Ploetz |
| 6,022,325 A | 2/2000 | Siczek et al. |
| 6,044,181 A | 3/2000 | Szeliski et al. |
| 6,067,079 A | 5/2000 | Shieh |
| 6,075,879 A | 6/2000 | Roehrig et al. |
| 6,075,905 A | 6/2000 | Herman et al. |
| 6,091,841 A | 7/2000 | Rogers |
| 6,101,236 A | 8/2000 | Wang et al. |
| 6,102,866 A | 8/2000 | Nields et al. |
| 6,104,840 A | 8/2000 | Ejiri et al. |
| 6,137,527 A | 10/2000 | Abdel-Malek |
| 6,141,398 A | 10/2000 | He |
| 6,149,301 A | 11/2000 | Kautzer et al. |
| 6,175,117 B1 | 1/2001 | Komardin |
| 6,196,715 B1 | 3/2001 | Nambu |
| 6,198,838 B1 | 3/2001 | Roehrig |
| 6,215,892 B1 | 4/2001 | Douglass et al. |
| 6,216,540 B1 | 4/2001 | Nelson |
| 6,219,059 B1 | 4/2001 | Argiro |
| 6,233,473 B1 | 5/2001 | Sheperd |
| 6,243,441 B1 | 6/2001 | Zur |
| 6,245,028 B1 | 6/2001 | Furst et al. |
| 6,249,616 B1 | 6/2001 | Hashimoto |
| 6,256,370 B1 | 7/2001 | Yavuz |
| 6,263,092 B1 | 7/2001 | Roehrig |
| 6,272,207 B1 | 8/2001 | Tang |
| 6,289,235 B1 | 9/2001 | Webber et al. |
| 6,292,530 B1 | 9/2001 | Yavus |
| 6,293,282 B1 | 9/2001 | Lemelson |
| 6,327,336 B1 | 12/2001 | Gingold et al. |
| 6,327,377 B1 | 12/2001 | Rutenberg et al. |
| 6,341,156 B1 | 1/2002 | Baetz |
| 6,349,153 B1 | 2/2002 | Teo |
| 6,359,617 B1 | 3/2002 | Xiong |
| 6,375,352 B1 | 4/2002 | Hewes |
| 6,389,104 B1 | 5/2002 | Bani-Hashemi et al. |
| 6,411,836 B1 | 6/2002 | Patel |
| 6,415,015 B2 | 7/2002 | Nicolas |
| 6,424,332 B1 | 7/2002 | Powell |
| 6,442,288 B1 | 8/2002 | Haerer |
| 6,459,925 B1 | 10/2002 | Nields et al. |
| 6,463,181 B2 | 10/2002 | Duarte |
| 6,468,226 B1 | 10/2002 | McIntyre, IV |
| 6,480,565 B1 | 11/2002 | Ning |
| 6,501,819 B2 | 12/2002 | Unger et al. |
| 6,556,655 B1 | 4/2003 | Chichereau |
| 6,574,304 B1 | 6/2003 | Hsieh |
| 6,597,762 B1 | 7/2003 | Ferrant |

(56) References Cited

U.S. PATENT DOCUMENTS

| | | |
|---|---|---|
| 6,611,575 B1 | 8/2003 | Alyassin et al. |
| 6,620,111 B2 | 9/2003 | Stephens et al. |
| 6,626,849 B2 | 9/2003 | Huitema et al. |
| 6,633,674 B1 | 10/2003 | Barnes |
| 6,638,235 B2 | 10/2003 | Miller et al. |
| 6,647,092 B2 | 11/2003 | Eberhard |
| 6,650,928 B1 | 11/2003 | Gailly |
| 6,683,934 B1 | 1/2004 | Zhao |
| 6,725,095 B2 | 4/2004 | Fenn |
| 6,744,848 B2 | 6/2004 | Stanton |
| 6,748,044 B2 | 6/2004 | Sabol et al. |
| 6,751,285 B2 | 6/2004 | Eberhard |
| 6,758,824 B1 | 7/2004 | Miller et al. |
| 6,813,334 B2 | 11/2004 | Koppe |
| 6,882,700 B2 | 4/2005 | Wang |
| 6,885,724 B2 | 4/2005 | Li |
| 6,901,156 B2 | 5/2005 | Giger et al. |
| 6,912,319 B1 | 6/2005 | Masuda et al. |
| 6,940,943 B2 | 9/2005 | Claus |
| 6,978,040 B2 | 12/2005 | Berestov |
| 6,987,331 B2 | 1/2006 | Koeppe |
| 6,999,554 B2 | 2/2006 | Mertelmeier |
| 7,022,075 B2 | 4/2006 | Grunwald et al. |
| 7,025,725 B2 | 4/2006 | Dione et al. |
| 7,030,861 B1 | 4/2006 | Westerman |
| 7,054,473 B1 | 5/2006 | Roehrig |
| 7,110,490 B2 | 9/2006 | Eberhard |
| 7,110,502 B2 | 9/2006 | Tsuji |
| 7,117,098 B1 | 10/2006 | Dunlay et al. |
| 7,123,684 B2 | 10/2006 | Jing et al. |
| 7,127,091 B2 | 10/2006 | OpDeBeek |
| 7,134,080 B2 | 11/2006 | Kjeldsen |
| 7,142,633 B2 | 11/2006 | Eberhard |
| 7,174,039 B2 | 2/2007 | Koo |
| 7,184,582 B2 | 2/2007 | Giger et al. |
| 7,218,766 B2 | 5/2007 | Eberhard |
| 7,245,694 B2 | 7/2007 | Jing et al. |
| 7,289,825 B2 | 10/2007 | Fors et al. |
| 7,298,881 B2 | 11/2007 | Giger et al. |
| 7,315,607 B2 | 1/2008 | Ramsauer |
| 7,319,735 B2 | 1/2008 | Defreitas et al. |
| 7,323,692 B2 | 1/2008 | Rowlands |
| 7,346,381 B2 | 3/2008 | Okerlund et al. |
| 7,406,150 B2 | 7/2008 | Minyard et al. |
| 7,430,272 B2 | 9/2008 | Jing et al. |
| 7,443,949 B2 | 10/2008 | Defreitas et al. |
| 7,466,795 B2 | 12/2008 | Eberhard et al. |
| 7,489,761 B2 | 2/2009 | DeFreitas |
| 7,505,555 B2 | 3/2009 | Hermann |
| 7,577,282 B2 | 8/2009 | Gkanatsios et al. |
| 7,606,801 B2 | 10/2009 | Faitelson et al. |
| 7,616,801 B2 | 11/2009 | Gkanatsios et al. |
| 7,630,533 B2 | 12/2009 | Ruth et al. |
| 7,634,050 B2 | 12/2009 | Muller et al. |
| 7,640,051 B2 | 12/2009 | Krishnan |
| 7,697,660 B2 | 4/2010 | Ning |
| 7,702,142 B2 | 4/2010 | Ren et al. |
| 7,705,830 B2 | 4/2010 | Westerman et al. |
| 7,731,662 B2 | 6/2010 | Anderson et al. |
| 7,760,924 B2 | 7/2010 | Ruth et al. |
| 7,769,219 B2 | 8/2010 | Zahniser |
| 7,787,936 B2 | 8/2010 | Kressy |
| 7,809,175 B2 | 10/2010 | Roehrig et al. |
| 7,828,733 B2 | 11/2010 | Zhang et al. |
| 7,831,296 B2 | 11/2010 | DeFreitas et al. |
| 7,869,563 B2 | 1/2011 | DeFreitas |
| 7,889,896 B2 | 2/2011 | Roehrig |
| 7,974,924 B2 | 7/2011 | Holla et al. |
| 7,991,106 B2 | 8/2011 | Ren et al. |
| 8,044,972 B2 | 10/2011 | Hall et al. |
| 8,051,386 B2 | 11/2011 | Rosander et al. |
| 8,126,226 B2 | 2/2012 | Bernard et al. |
| 8,155,421 B2 | 4/2012 | Ren et al. |
| 8,160,677 B2 | 4/2012 | Gielen et al. |
| 8,165,365 B2 | 4/2012 | Bernard et al. |
| 8,192,361 B2 | 6/2012 | Sendai |
| 8,465,413 B2 | 6/2013 | Deitch |
| 8,532,745 B2 | 9/2013 | DeFreitas et al. |
| 8,571,289 B2 | 10/2013 | Ruth |
| 8,594,274 B2 | 11/2013 | Hoernig et al. |
| 8,677,282 B2 | 3/2014 | Cragun et al. |
| 8,712,127 B2 | 4/2014 | Ren et al. |
| 8,897,535 B2 | 11/2014 | Ruth et al. |
| 8,942,342 B2 | 1/2015 | Abenaim |
| 8,983,156 B2 | 3/2015 | Periaswamy et al. |
| 9,019,262 B2 | 4/2015 | Ma |
| 9,020,579 B2 | 4/2015 | Smith |
| 9,075,903 B2 | 7/2015 | Marshall |
| 9,084,579 B2 | 7/2015 | Ren et al. |
| 9,119,599 B2 | 9/2015 | Itai |
| 9,129,362 B2 | 9/2015 | Jerebko |
| 9,160,793 B2 | 10/2015 | Base et al. |
| 9,289,183 B2 | 3/2016 | Karssemeijer |
| 9,451,924 B2 | 9/2016 | Bernard |
| 9,456,797 B2 | 10/2016 | Ruth et al. |
| 9,478,028 B2 | 10/2016 | Parthasarathy |
| 9,589,374 B1 | 3/2017 | Gao |
| 9,592,019 B2 | 3/2017 | Sugiyama |
| 9,805,507 B2 | 10/2017 | Chen |
| 9,808,215 B2 | 11/2017 | Ruth et al. |
| 9,811,758 B2 | 11/2017 | Ren et al. |
| 9,901,309 B2 | 2/2018 | DeFreitas et al. |
| 9,901,320 B2 | 2/2018 | DeFreitas et al. |
| 10,008,184 B2 | 6/2018 | Kreeger et al. |
| 10,010,302 B2 | 7/2018 | Ruth et al. |
| 10,092,358 B2 | 10/2018 | DeFreitas |
| 10,111,631 B2 | 10/2018 | Gkanatsios |
| 10,242,490 B2 | 3/2019 | Karssemeijer |
| 10,335,094 B2 | 7/2019 | DeFreitas |
| 10,357,211 B2 | 7/2019 | Smith |
| 10,410,417 B2 | 9/2019 | Chen et al. |
| 10,413,263 B2 | 9/2019 | Ruth et al. |
| 10,444,960 B2 | 10/2019 | Marshall |
| 10,456,213 B2 | 10/2019 | DeFreitas |
| 10,573,276 B2 | 2/2020 | Kreeger et al. |
| 10,575,807 B2 | 3/2020 | Gkanatsios |
| 10,595,954 B2 | 3/2020 | DeFreitas |
| 10,624,598 B2 | 4/2020 | Chen |
| 10,733,566 B1 | 8/2020 | Chan |
| 10,956,701 B2 | 3/2021 | Laviola |
| 10,977,863 B2 | 4/2021 | Chen |
| 10,978,026 B2 | 4/2021 | Kreeger |
| 11,126,649 B2 | 9/2021 | Eswaran et al. |
| 11,379,516 B2 | 7/2022 | Peng et al. |
| 11,462,311 B2 | 10/2022 | Chan |
| 11,853,401 B1 * | 12/2023 | Nookula ............ G06F 18/2163 |
| 11,883,206 B2 | 1/2024 | Chen |
| 2001/0038681 A1 | 11/2001 | Stanton et al. |
| 2001/0038861 A1 | 11/2001 | Hsu et al. |
| 2001/0044578 A1 | 11/2001 | Ben-Haim et al. |
| 2002/0012450 A1 | 1/2002 | Tsuji |
| 2002/0050986 A1 | 5/2002 | Inoue |
| 2002/0075997 A1 | 6/2002 | Unger et al. |
| 2002/0113681 A1 | 8/2002 | Byram |
| 2002/0122533 A1 | 9/2002 | Marie et al. |
| 2002/0188466 A1 | 12/2002 | Barrette et al. |
| 2002/0193676 A1 | 12/2002 | Bodicker |
| 2003/0007598 A1 | 1/2003 | Wang et al. |
| 2003/0018272 A1 | 1/2003 | Treado et al. |
| 2003/0026386 A1 | 2/2003 | Tang |
| 2003/0048260 A1 | 3/2003 | Matusis |
| 2003/0055471 A1 | 3/2003 | Fenn et al. |
| 2003/0073895 A1 | 4/2003 | Nields et al. |
| 2003/0095624 A1 | 5/2003 | Eberhard et al. |
| 2003/0097055 A1 | 5/2003 | Yanof |
| 2003/0128893 A1 | 7/2003 | Castorina |
| 2003/0135115 A1 | 7/2003 | Burdette et al. |
| 2003/0169847 A1 | 9/2003 | Karellas |
| 2003/0194050 A1 | 10/2003 | Eberhard et al. |
| 2003/0194121 A1 | 10/2003 | Eberhard et al. |
| 2003/0210254 A1 | 11/2003 | Doan |
| 2003/0212327 A1 | 11/2003 | Wang |
| 2003/0215120 A1 | 11/2003 | Uppaluri |
| 2004/0008809 A1 | 1/2004 | Webber |

(56) References Cited

U.S. PATENT DOCUMENTS

| | | |
|---|---|---|
| 2004/0008900 A1 | 1/2004 | Jabri et al. |
| 2004/0008901 A1 | 1/2004 | Avinash |
| 2004/0036680 A1 | 2/2004 | Davis |
| 2004/0047518 A1 | 3/2004 | Tiana |
| 2004/0052328 A1 | 3/2004 | Saboi |
| 2004/0066884 A1 | 4/2004 | Claus |
| 2004/0066904 A1 | 4/2004 | Eberhard et al. |
| 2004/0070582 A1 | 4/2004 | Smith et al. |
| 2004/0077938 A1 | 4/2004 | Mark et al. |
| 2004/0077944 A1 | 4/2004 | Steinberg |
| 2004/0081273 A1 | 4/2004 | Ning |
| 2004/0094167 A1 | 5/2004 | Brady |
| 2004/0101095 A1 | 5/2004 | Jing et al. |
| 2004/0109028 A1 | 6/2004 | Stern et al. |
| 2004/0109529 A1 | 6/2004 | Eberhard et al. |
| 2004/0127789 A1 | 7/2004 | Ogawa |
| 2004/0138569 A1 | 7/2004 | Grunwald |
| 2004/0171933 A1 | 9/2004 | Stoller et al. |
| 2004/0171986 A1 | 9/2004 | Tremaglio, Jr. et al. |
| 2004/0267157 A1 | 12/2004 | Miller et al. |
| 2005/0020903 A1 | 1/2005 | Krishnan et al. |
| 2005/0047636 A1 | 3/2005 | Gines et al. |
| 2005/0049497 A1 | 3/2005 | Krishnan et al. |
| 2005/0049521 A1 | 3/2005 | Miller et al. |
| 2005/0063509 A1 | 3/2005 | Defreitas et al. |
| 2005/0078797 A1 | 4/2005 | Danielsson et al. |
| 2005/0084060 A1 | 4/2005 | Seppi et al. |
| 2005/0089205 A1 | 4/2005 | Kapur |
| 2005/0105679 A1 | 5/2005 | Wu et al. |
| 2005/0107689 A1 | 5/2005 | Sasano |
| 2005/0108643 A1 | 5/2005 | Schybergson |
| 2005/0111718 A1 | 5/2005 | MacMahon |
| 2005/0113681 A1 | 5/2005 | DeFreitas et al. |
| 2005/0113715 A1 | 5/2005 | Schwindt et al. |
| 2005/0124845 A1 | 6/2005 | Thomadsen et al. |
| 2005/0135555 A1 | 6/2005 | Claus |
| 2005/0135664 A1 | 6/2005 | Kaufhold |
| 2005/0226375 A1 | 10/2005 | Eberhard |
| 2006/0004278 A1 | 1/2006 | Giger |
| 2006/0009693 A1 | 1/2006 | Hanover et al. |
| 2006/0018526 A1 | 1/2006 | Avinash |
| 2006/0025680 A1 | 2/2006 | Jeune-Iomme |
| 2006/0030784 A1 | 2/2006 | Miller et al. |
| 2006/0074287 A1 | 4/2006 | Neumann |
| 2006/0074288 A1 | 4/2006 | Kelly et al. |
| 2006/0098855 A1 | 5/2006 | Gkanatsios et al. |
| 2006/0126794 A1 | 6/2006 | Hermann |
| 2006/0129062 A1 | 6/2006 | Nicoson et al. |
| 2006/0132508 A1 | 6/2006 | Sadikali |
| 2006/0147099 A1 | 7/2006 | Marshall et al. |
| 2006/0155209 A1 | 7/2006 | Miller et al. |
| 2006/0178601 A1 | 8/2006 | Wang |
| 2006/0197753 A1 | 9/2006 | Hotelling |
| 2006/0210131 A1 | 9/2006 | Wheeler |
| 2006/0228012 A1 | 10/2006 | Masuzawa |
| 2006/0238546 A1 | 10/2006 | Handley |
| 2006/0257009 A1 | 11/2006 | Wang |
| 2006/0269040 A1 | 11/2006 | Mertelmeier |
| 2006/0291618 A1 | 12/2006 | Eberhard et al. |
| 2007/0019846 A1 | 1/2007 | Bullitt et al. |
| 2007/0030949 A1 | 2/2007 | Jing et al. |
| 2007/0036265 A1 | 2/2007 | Jing et al. |
| 2007/0046649 A1 | 3/2007 | Reiner |
| 2007/0052700 A1 | 3/2007 | Wheeler et al. |
| 2007/0076844 A1 | 4/2007 | Defreitas et al. |
| 2007/0114424 A1 | 5/2007 | Danielsson et al. |
| 2007/0118400 A1 | 5/2007 | Morita et al. |
| 2007/0156451 A1 | 7/2007 | Gering |
| 2007/0167709 A1 | 7/2007 | Slayton |
| 2007/0223651 A1 | 9/2007 | Wagenaar et al. |
| 2007/0225600 A1 | 9/2007 | Weibrecht et al. |
| 2007/0232882 A1 | 10/2007 | Glossop |
| 2007/0236490 A1 | 10/2007 | Casteele |
| 2007/0242800 A1 | 10/2007 | Jing et al. |
| 2007/0263765 A1 | 11/2007 | Wu |
| 2007/0274585 A1 | 11/2007 | Zhang et al. |
| 2007/0280412 A1 | 12/2007 | DeFreitas |
| 2008/0019581 A1 | 1/2008 | Gkanatsios et al. |
| 2008/0045833 A1 | 2/2008 | DeFreitas et al. |
| 2008/0101537 A1 | 5/2008 | Sendai |
| 2008/0103834 A1 | 5/2008 | Reiner |
| 2008/0114614 A1 | 5/2008 | Mahesh et al. |
| 2008/0125643 A1 | 5/2008 | Huisman |
| 2008/0130979 A1 | 6/2008 | Ren |
| 2008/0139896 A1 | 6/2008 | Baumgart |
| 2008/0152086 A1 | 6/2008 | Hall |
| 2008/0165136 A1 | 7/2008 | Christie et al. |
| 2008/0181361 A1 | 7/2008 | Eldered |
| 2008/0187095 A1 | 8/2008 | Boone et al. |
| 2008/0198966 A1 | 8/2008 | Hjarn |
| 2008/0229256 A1 | 9/2008 | Shibaike |
| 2008/0240533 A1 | 10/2008 | Piron et al. |
| 2008/0242968 A1 | 10/2008 | Claus et al. |
| 2008/0297482 A1 | 12/2008 | Weiss |
| 2009/0003519 A1 | 1/2009 | DeFreitas |
| 2009/0005668 A1 | 1/2009 | West et al. |
| 2009/0010384 A1 | 1/2009 | Jing et al. |
| 2009/0024030 A1 | 1/2009 | Lachaine |
| 2009/0034684 A1 | 2/2009 | Bernard |
| 2009/0037821 A1 | 2/2009 | O'Neal et al. |
| 2009/0079705 A1 | 3/2009 | Sizelove et al. |
| 2009/0080594 A1 | 3/2009 | Brooks et al. |
| 2009/0080602 A1 | 3/2009 | Brooks et al. |
| 2009/0080604 A1 | 3/2009 | Shores et al. |
| 2009/0080752 A1 | 3/2009 | Ruth |
| 2009/0080765 A1 | 3/2009 | Bernard et al. |
| 2009/0087067 A1 | 4/2009 | Khorasani |
| 2009/0118614 A1 | 5/2009 | Sendai |
| 2009/0123052 A1 | 5/2009 | Ruth |
| 2009/0124906 A1 | 5/2009 | Caluser |
| 2009/0129644 A1 | 5/2009 | Daw et al. |
| 2009/0135997 A1 | 5/2009 | Defreitas et al. |
| 2009/0138280 A1 | 5/2009 | Morita et al. |
| 2009/0143674 A1 | 6/2009 | Nields |
| 2009/0167702 A1 | 7/2009 | Nurmi |
| 2009/0171244 A1 | 7/2009 | Ning |
| 2009/0175408 A1 | 7/2009 | Goodsitt et al. |
| 2009/0177495 A1 | 7/2009 | Abousy et al. |
| 2009/0238424 A1 | 9/2009 | Arakita |
| 2009/0259958 A1 | 10/2009 | Ban |
| 2009/0268865 A1 | 10/2009 | Ren et al. |
| 2009/0278812 A1 | 11/2009 | Yasutake |
| 2009/0296882 A1 | 12/2009 | Gkanatsios et al. |
| 2009/0304147 A1 | 12/2009 | Jing et al. |
| 2010/0016707 A1 | 1/2010 | Amara et al. |
| 2010/0034348 A1 | 2/2010 | Yu |
| 2010/0049046 A1 | 2/2010 | Peiffer |
| 2010/0054400 A1 | 3/2010 | Ren et al. |
| 2010/0079405 A1 | 4/2010 | Bernstein |
| 2010/0086188 A1 | 4/2010 | Ruth et al. |
| 2010/0088346 A1 | 4/2010 | Umness et al. |
| 2010/0098214 A1 | 4/2010 | Star-Lack et al. |
| 2010/0105879 A1 | 4/2010 | Katayose et al. |
| 2010/0121178 A1 | 5/2010 | Krishnan |
| 2010/0131294 A1 | 5/2010 | Venon |
| 2010/0131482 A1 | 5/2010 | Linthicum et al. |
| 2010/0135558 A1 | 6/2010 | Ruth et al. |
| 2010/0152570 A1 | 6/2010 | Navab |
| 2010/0166147 A1 | 7/2010 | Abenaim |
| 2010/0166267 A1 | 7/2010 | Zhang |
| 2010/0195882 A1 | 8/2010 | Ren et al. |
| 2010/0208037 A1 | 8/2010 | Sendai |
| 2010/0231522 A1 | 9/2010 | Li |
| 2010/0250275 A1 | 9/2010 | Sakagawa |
| 2010/0259561 A1 | 10/2010 | Forutanpour et al. |
| 2010/0259645 A1 | 10/2010 | Kaplan |
| 2010/0260316 A1 | 10/2010 | Stein et al. |
| 2010/0280375 A1 | 11/2010 | Zhang |
| 2010/0292571 A1 | 11/2010 | Kim |
| 2010/0293500 A1 | 11/2010 | Cragun |
| 2011/0019891 A1 | 1/2011 | Puong |
| 2011/0054944 A1 | 3/2011 | Sandberg et al. |
| 2011/0069808 A1 | 3/2011 | Defreitas et al. |
| 2011/0069906 A1 | 3/2011 | Park |

(56) References Cited

U.S. PATENT DOCUMENTS

| | | |
|---|---|---|
| 2011/0087132 A1 | 4/2011 | DeFreitas et al. |
| 2011/0105879 A1 | 5/2011 | Masumoto |
| 2011/0109650 A1 | 5/2011 | Kreeger |
| 2011/0110576 A1 | 5/2011 | Kreeger |
| 2011/0150447 A1 | 6/2011 | Li |
| 2011/0163939 A1 | 7/2011 | Tam et al. |
| 2011/0178389 A1 | 7/2011 | Kumar et al. |
| 2011/0182402 A1 | 7/2011 | Partain |
| 2011/0234630 A1 | 9/2011 | Batman et al. |
| 2011/0237927 A1 | 9/2011 | Brooks et al. |
| 2011/0242092 A1 | 10/2011 | Kashiwagi |
| 2011/0257919 A1 | 10/2011 | Reiner |
| 2011/0268339 A1 | 11/2011 | Volokh |
| 2011/0310126 A1 | 12/2011 | Georgiev et al. |
| 2011/0313288 A1 | 12/2011 | Chi Sing |
| 2012/0014504 A1 | 1/2012 | Jang |
| 2012/0014578 A1 | 1/2012 | Karssemeijer |
| 2012/0035462 A1 | 2/2012 | Maurer et al. |
| 2012/0050321 A1 | 3/2012 | Arieli |
| 2012/0069951 A1 | 3/2012 | Toba |
| 2012/0131488 A1 | 5/2012 | Karlsson et al. |
| 2012/0133600 A1 | 5/2012 | Marshall |
| 2012/0133601 A1 | 5/2012 | Marshall |
| 2012/0134464 A1 | 5/2012 | Hoernig et al. |
| 2012/0148151 A1 | 6/2012 | Hamada |
| 2012/0150034 A1 | 6/2012 | DeFreitas et al. |
| 2012/0189092 A1 | 7/2012 | Jerebko |
| 2012/0194425 A1 | 8/2012 | Buelow |
| 2012/0238870 A1 | 9/2012 | Smith et al. |
| 2012/0256920 A1 | 10/2012 | Marshall et al. |
| 2012/0259230 A1 | 10/2012 | Riley |
| 2012/0293511 A1 | 11/2012 | Mertelmeier |
| 2012/0302887 A1 | 11/2012 | Anderson et al. |
| 2013/0022165 A1 | 1/2013 | Jang |
| 2013/0044861 A1 | 2/2013 | Muller |
| 2013/0059758 A1 | 3/2013 | Haick |
| 2013/0090554 A1 | 4/2013 | Zvuloni |
| 2013/0108138 A1 | 5/2013 | Nakayama |
| 2013/0121569 A1 | 5/2013 | Yadav |
| 2013/0121618 A1 | 5/2013 | Yadav |
| 2013/0202168 A1 | 8/2013 | Jerebko |
| 2013/0259193 A1 | 10/2013 | Packard |
| 2014/0033126 A1 | 1/2014 | Kreeger |
| 2014/0035811 A1 | 2/2014 | Guehring |
| 2014/0050384 A1 | 2/2014 | Schmidt et al. |
| 2014/0064444 A1 | 3/2014 | Oh |
| 2014/0073913 A1 | 3/2014 | DeFreitas et al. |
| 2014/0219534 A1 | 8/2014 | Wiemker et al. |
| 2014/0219548 A1 | 8/2014 | Wels |
| 2014/0327702 A1 | 11/2014 | Kreeger et al. |
| 2014/0328517 A1 | 11/2014 | Gluncic |
| 2014/0328530 A1 | 11/2014 | Lee |
| 2015/0051489 A1 | 2/2015 | Caluser |
| 2015/0052471 A1 | 2/2015 | Chen |
| 2015/0061582 A1 | 3/2015 | Tatsuta et al. |
| 2015/0087984 A1 | 3/2015 | Tateyama |
| 2015/0182191 A1 | 7/2015 | Caluser et al. |
| 2015/0199478 A1 | 7/2015 | Bhatia et al. |
| 2015/0238148 A1 | 8/2015 | Georgescu |
| 2015/0245817 A1 | 9/2015 | Stone |
| 2015/0302146 A1 | 10/2015 | Marshall |
| 2015/0309712 A1 | 10/2015 | Marshall |
| 2015/0317538 A1 | 11/2015 | Ren et al. |
| 2015/0324522 A1 | 11/2015 | Chan |
| 2015/0331995 A1 | 11/2015 | Zhao |
| 2015/0347693 A1 | 12/2015 | Lam et al. |
| 2015/0375399 A1 | 12/2015 | Chiu |
| 2016/0000399 A1 | 1/2016 | Halmann et al. |
| 2016/0022364 A1 | 1/2016 | DeFreitas et al. |
| 2016/0048958 A1 | 2/2016 | Miga et al. |
| 2016/0051215 A1 | 2/2016 | Chen |
| 2016/0074012 A1 | 3/2016 | Forzoni |
| 2016/0078645 A1 | 3/2016 | Abdurahman |
| 2016/0166217 A1 | 6/2016 | Davis |
| 2016/0216769 A1 | 7/2016 | Goetz |
| 2016/0228034 A1 | 8/2016 | Gluncic |
| 2016/0228068 A1 | 8/2016 | Hancu |
| 2016/0235379 A1 | 8/2016 | Homann |
| 2016/0235380 A1 | 8/2016 | Smith |
| 2016/0317129 A1 | 11/2016 | Seip |
| 2016/0328998 A1 | 11/2016 | Pedersen |
| 2016/0364630 A1 | 12/2016 | Reicher |
| 2016/0367210 A1 | 12/2016 | Gkanatsios |
| 2017/0071562 A1 | 3/2017 | Suzuki |
| 2017/0181809 A1 | 6/2017 | Panescu |
| 2017/0185904 A1* | 6/2017 | Padmanabhan .......... G06N 5/04 |
| 2017/0193655 A1 | 7/2017 | Madabhushi |
| 2017/0213131 A1* | 7/2017 | Hammond .......... G06F 18/2148 |
| 2017/0251991 A1 | 9/2017 | Wang |
| 2017/0262737 A1 | 9/2017 | Rabinovich |
| 2017/0265947 A1 | 9/2017 | Dyer |
| 2017/0301081 A1 | 10/2017 | Yang et al. |
| 2017/0340303 A1 | 11/2017 | Stango |
| 2017/0364645 A1 | 12/2017 | Jester |
| 2018/0018590 A1 | 1/2018 | Szeto |
| 2018/0047211 A1 | 2/2018 | Chen et al. |
| 2018/0068066 A1 | 3/2018 | Bronkalla |
| 2018/0125446 A1 | 5/2018 | Boroczky |
| 2018/0137385 A1 | 5/2018 | Ren |
| 2018/0144244 A1 | 5/2018 | Masoud |
| 2018/0249985 A1 | 9/2018 | DeFreitas |
| 2018/0256118 A1 | 9/2018 | DeFreitas |
| 2018/0286504 A1 | 10/2018 | Trovato |
| 2019/0015058 A1 | 1/2019 | Valenzuela |
| 2019/0015173 A1 | 1/2019 | DeFreitas |
| 2019/0043456 A1 | 2/2019 | Kreeger |
| 2019/0057778 A1 | 2/2019 | Porter |
| 2019/0064929 A1 | 2/2019 | Tomeh |
| 2019/0111282 A1 | 4/2019 | Yamada |
| 2019/0138693 A1 | 5/2019 | Muller et al. |
| 2019/0155633 A1* | 5/2019 | Faulhaber, Jr. .......... G06N 5/04 |
| 2019/0188848 A1 | 6/2019 | Madani et al. |
| 2019/0201106 A1 | 7/2019 | Siemionow et al. |
| 2019/0221304 A1 | 7/2019 | Ionasec |
| 2019/0272640 A1 | 9/2019 | Sugahara |
| 2019/0290221 A1 | 9/2019 | Smith |
| 2019/0295248 A1 | 9/2019 | Nakamura et al. |
| 2019/0328482 A1 | 10/2019 | Izmirili |
| 2020/0043600 A1 | 2/2020 | Glottmann et al. |
| 2020/0046303 A1 | 2/2020 | DeFreitas |
| 2020/0093562 A1 | 3/2020 | DeFreitas |
| 2020/0160510 A1 | 5/2020 | Lindemer |
| 2020/0167920 A1 | 5/2020 | Hall et al. |
| 2020/0184262 A1 | 6/2020 | Chui |
| 2020/0205928 A1 | 7/2020 | DeFreitas |
| 2020/0211692 A1* | 7/2020 | Kalafut et al. .......... G16H 30/40 |
| 2020/0253573 A1 | 8/2020 | Gkanatsios |
| 2020/0284591 A1 | 9/2020 | Shapira et al. |
| 2020/0286613 A1 | 9/2020 | Rego |
| 2020/0311938 A1 | 10/2020 | Vincent |
| 2020/0323512 A1 | 10/2020 | Ng |
| 2020/0345320 A1 | 11/2020 | Chen |
| 2020/0345324 A1 | 11/2020 | Matsumoto |
| 2020/0352543 A1 | 11/2020 | DeFreitas |
| 2020/0357118 A1 | 11/2020 | Yao |
| 2020/0381125 A1 | 12/2020 | Hao et al. |
| 2020/0390404 A1 | 12/2020 | DeFreitas |
| 2021/0000553 A1 | 1/2021 | St. Pierre |
| 2021/0030366 A1 | 2/2021 | Chen |
| 2021/0035680 A1 | 2/2021 | Chen |
| 2021/0038921 A1 | 2/2021 | Nguyen |
| 2021/0085387 A1 | 3/2021 | Amit |
| 2021/0098120 A1 | 4/2021 | Kshirsagar |
| 2021/0100518 A1 | 4/2021 | Chui |
| 2021/0100626 A1 | 4/2021 | St. Pierre |
| 2021/0113167 A1 | 4/2021 | Chui |
| 2021/0118199 A1 | 4/2021 | Chui |
| 2021/0128268 A1 | 5/2021 | Rulkov |
| 2021/0224508 A1 | 7/2021 | Laviola |
| 2021/0256289 A1 | 8/2021 | Kumagi |
| 2021/0303078 A1 | 9/2021 | Wells |
| 2021/0390775 A1 | 12/2021 | Ratner |
| 2021/0398650 A1* | 12/2021 | Baker .................... G16H 80/00 |
| 2022/0000491 A1 | 1/2022 | Henry |

(56) References Cited

U.S. PATENT DOCUMENTS

| | | | |
|---|---|---|---|
| 2022/0005277 A1 | 1/2022 | Chen | |
| 2022/0013089 A1 | 1/2022 | Kreeger | |
| 2022/0133258 A1 | 5/2022 | Yin et al. | |
| 2022/0164951 A1 | 5/2022 | Chui | |
| 2022/0265387 A1 | 8/2022 | Daon | |
| 2022/0405644 A1* | 12/2022 | Szeto | G16H 10/60 |
| 2023/0098785 A1 | 3/2023 | St. Pierre | |
| 2023/0285081 A1 | 9/2023 | Wagner | |
| 2024/0021297 A1 | 1/2024 | Kshirsagar | |
| 2024/0242820 A1 | 7/2024 | Kshirsagar | |
| 2025/0140389 A1 | 5/2025 | Kshirsagar | |

FOREIGN PATENT DOCUMENTS

| | | |
|---|---|---|
| CN | 1846622 | 10/2006 |
| CN | 1853573 | 11/2006 |
| CN | 101360453 | 2/2009 |
| CN | 101517582 | 8/2009 |
| CN | 101959456 A | 1/2011 |
| CN | 102016859 A | 4/2011 |
| CN | 202161328 | 3/2012 |
| CN | 102429678 | 5/2012 |
| CN | 102448375 | 5/2012 |
| CN | 102473300 A | 5/2012 |
| CN | 102855483 A | 1/2013 |
| CN | 105025799 A | 11/2015 |
| CN | 107440730 | 12/2017 |
| CN | 108140425 | 6/2018 |
| CN | 108463270 A | 8/2018 |
| CN | 108492874 | 9/2018 |
| CN | 111584046 | 8/2020 |
| DE | 103 05 640 | 8/2003 |
| DE | 102010009295 | 8/2011 |
| DE | 102011087127 | 5/2013 |
| EP | 775467 | 5/1997 |
| EP | 982001 | 3/2000 |
| EP | 1428473 | 6/2004 |
| EP | 2236085 | 6/2010 |
| EP | 2215600 | 8/2010 |
| EP | 2301432 | 3/2011 |
| EP | 2491863 | 8/2012 |
| EP | 1986548 | 1/2013 |
| EP | 2656789 | 10/2013 |
| EP | 2823464 | 1/2015 |
| EP | 2823765 | 1/2015 |
| EP | 3060132 | 4/2019 |
| JP | H07253963 A | 10/1995 |
| JP | H09-198490 | 7/1997 |
| JP | H09-238934 | 9/1997 |
| JP | H10-33523 | 2/1998 |
| JP | 2000-200340 | 7/2000 |
| JP | 2002-282248 | 10/2002 |
| JP | 2003-189179 | 7/2003 |
| JP | 2003-199737 | 7/2003 |
| JP | 2003-527880 | 9/2003 |
| JP | 2003-531516 | 10/2003 |
| JP | 2005125080 | 5/2005 |
| JP | 2006-505376 | 2/2006 |
| JP | 2006-519634 | 8/2006 |
| JP | 2006-312026 | 11/2006 |
| JP | 2007-130487 | 5/2007 |
| JP | 2007-515242 | 6/2007 |
| JP | 2007-330334 | 12/2007 |
| JP | 2007-536968 | 12/2007 |
| JP | 2008-068032 | 3/2008 |
| JP | 2008518722 | 6/2008 |
| JP | 2009502347 | 1/2009 |
| JP | 2009-034503 | 2/2009 |
| JP | 2009-522005 | 6/2009 |
| JP | 2009-157527 | 7/2009 |
| JP | 2009-526618 | 7/2009 |
| JP | 2009-207545 | 9/2009 |
| JP | 2010-137004 | 6/2010 |
| JP | 2011-508242 | 3/2011 |
| JP | 2012-501750 | 1/2012 |
| JP | 2012011255 | 1/2012 |
| JP | 2012-061196 | 3/2012 |
| JP | 2013-244211 | 12/2013 |
| JP | 2014-507250 | 3/2014 |
| JP | 2014-534042 | 12/2014 |
| JP | 2015-506794 | 3/2015 |
| JP | 2015-065975 | 4/2015 |
| JP | 2016-198197 | 12/2015 |
| JP | 2016-035739 | 3/2016 |
| JP | 2019-170794 | 10/2019 |
| JP | 2020-048685 | 4/2020 |
| JP | 2020-156823 | 10/2020 |
| KR | 10-2015-0010515 | 1/2015 |
| KR | 10-2017-0062839 | 6/2017 |
| KR | 10-2013857 | 8/2019 |
| WO | 90/05485 | 5/1990 |
| WO | 93/17620 | 9/1993 |
| WO | 94/06352 | 3/1994 |
| WO | 1997/00649 | 1/1997 |
| WO | 1998/16903 | 4/1998 |
| WO | 00/51484 | 9/2000 |
| WO | 0154463 | 7/2001 |
| WO | 2003/020114 | 3/2003 |
| WO | 2005/052838 | 6/2005 |
| WO | 2005051197 | 6/2005 |
| WO | 2005/079306 | 9/2005 |
| WO | 2005/110230 | 11/2005 |
| WO | 2005/112767 | 12/2005 |
| WO | 2006/055830 | 5/2006 |
| WO | 2006/058160 | 6/2006 |
| WO | 2007/095330 | 8/2007 |
| WO | 08/014670 | 2/2008 |
| WO | 2008047270 | 4/2008 |
| WO | 2008/054436 | 5/2008 |
| WO | 2009/026587 | 2/2009 |
| WO | 2010/028208 | 3/2010 |
| WO | 2010059920 | 5/2010 |
| WO | 2011008239 | 1/2011 |
| WO | 2011/043838 | 4/2011 |
| WO | 2011/063530 | 6/2011 |
| WO | 2011065950 | 6/2011 |
| WO | 2011073864 | 6/2011 |
| WO | 2011091300 | 7/2011 |
| WO | 2012/001572 | 1/2012 |
| WO | 2012/068373 | 5/2012 |
| WO | 2012063653 | 5/2012 |
| WO | 2012/073164 | 6/2012 |
| WO | 2012/112627 | 8/2012 |
| WO | 2012/122399 | 9/2012 |
| WO | 2013/001439 | 1/2013 |
| WO | 2013/035026 | 3/2013 |
| WO | 2013/078476 | 5/2013 |
| WO | 2013/123091 | 8/2013 |
| WO | 2014/149554 | 9/2014 |
| WO | 2014/194171 | 12/2014 |
| WO | 2014/207080 | 12/2014 |
| WO | 2015/061582 | 4/2015 |
| WO | 2015/066650 | 5/2015 |
| WO | 2015/130916 | 9/2015 |
| WO | 2016/103094 | 6/2016 |
| WO | 2016/184746 | 11/2016 |
| WO | 2017/058848 | 4/2017 |
| WO | 2017/197476 | 11/2017 |
| WO | 2017/218773 | 12/2017 |
| WO | 2018/183548 | 10/2018 |
| WO | 2018/183549 | 10/2018 |
| WO | 2018/183550 | 10/2018 |
| WO | 2018/236565 | 12/2018 |
| WO | 2019/030410 | 2/2019 |
| WO | 2019/060843 | 3/2019 |
| WO | 2016/057960 | 5/2019 |
| WO | 2019/091807 | 5/2019 |
| WO | 2019/102917 | 5/2019 |
| WO | 2019/227042 | 11/2019 |
| WO | 2018/221689 | 4/2020 |
| WO | 2020/216307 | 10/2020 |
| WO | 2021/168281 | 8/2021 |
| WO | 2021/195370 | 9/2021 |

(56) References Cited

FOREIGN PATENT DOCUMENTS

OTHER PUBLICATIONS

"Filtered Back Projection", (NYGREN), published May 8, 2007, URL: http://web.archive.org/web/19991010131715/http://www.owlnet.rice.edu/~elec539/Projects97/cult/node2.html, 2 pgs.
"Supersonic to feature Aixplorer Ultimate at ECR", AuntiMinnie.com, 3 pages (Feb. 2018).
Berg WA et al., "Combined screening with ultrasound and mammography vs mammography alone in women at elevated risk of breast cancer", JAMA 299:2151-2163, 2008.
Burbank, Fred, "Stereotactic Breast Biopsy: Its History, Its Present, and Its Future", published in 1996 at the Southeastern Surgical Congress, 24 pages.
Bushberg, Jerrold et al., "The Essential Physics of Medical Imaging", 3rd ed., In: "The Essential Physics of Medical Imaging, Third Edition", Dec. 28, 2011, Lippincott & Wilkins, Philadelphia, PA, USA, XP05579051, pp. 270-272.
Canadian Office Action in Application 2829349, mailed Oct. 15, 2018, 4 pages.
Carton AK, et al., "Dual-energy contrast-enhanced digital breast tomosynthesis—a feasibility study", BRJ Radiol. Apr. 2010;83(988):344-50.
Chen SC, et al., "Initial clinical experience with contrast-enhanced digital breast tomosynthesis", Acad Radio. Feb. 2007 14(2):229-38.
Chinese 2nd Office Action in Application 201480058064.5, mailed Jul. 16, 2019, 5 pgs.
Diekmann F., et al., "Digital mammography using iodine-based contrast media: initial clinical experience with dynamic contrast medium enhancement", Invest Radiol 2005; 40:397-404.
Dromain C., et al., "Contrast enhanced spectral mammography: a multi-reader study", RSNA 2010, 96th Scientific Assembly and Scientific Meeting.
Dromain C., et al., "Contrast-enhanced digital mammography", Eur J Radiol. 2009; 69:34-42.
Dromain, Clarisse et al., "Dual-energy contrast-enhanced digital mammography: initial clinical results", European Radiology, Sep. 14, 2010, vol. 21, pp. 565-574.
E. Shaw de Paredes et al., "Interventional Breast Procedure", published Sep./Oct. 1998 in Curr Probl Diagn Radiol, pp. 138-184.
European Communication in Application 10707751.3, mailed Oct. 4, 2018, 5 pages.
European Communication in Application 10707751.3, mailed Aug. 7, 2019, 6 pages.
European Extended Search Report dated Jul. 18, 2014 in EP App 12754521.8, 7 pages.
European Extended Search Report for European Patent Application No. 14770362.3 mailed Sep. 28, 2016, 8 pgs.
European Extended Search Report in Application 14855181.5, mailed May 15, 2017, 7 pages.
European extended Search Report in Application 18153706.9, mailed Jun. 1, 2018, 8 pages.
European Mar. 23, 2009 European Search Report in connection with counterpart European patent Application No. 07/750,818.
European Office Action in Application 10707751.3, mailed Feb. 19, 2018, 5 pgs.
Fischer Imaging Corp, Mammotest Plus manual on minimally invasive breast biopsy system, 2002, 8 pages.
Fischer Imaging Corporation, Installation Manual, MammoTest Family of Breast Biopsy Systems, 86683G, 86684G, P-55957-IM, Issue 1, Revision 3, Jul. 2005, 98 pages.
Fischer Imaging Corporation, Operator Manual, MammoTest Family of Breast Biopsy Systems, 86683G, 86684G, P-55956-OM, Issue 1, Revision 6, Sep. 2005, 258 pages.
Freiherr G., "Breast tomosynthesis trials show promise", Diagnostic Imaging—San Francisco 2005, V27; N4:42-48.
Georgian-Smith, Dianne, et al., "Stereotactic Biopsy of the Breast Using an Upright Unit, a Vacuum-Suction Needle, and a Lateral Arm-Support System", 2001, at the American Roentgen Ray Society meeting, 8 pages.

Giger, M. et al., "An "Intelligent" Workstation for Computer-aided Diagnosis", RadioGraphics, (1993), 13(3): 647-656.
Giger, M. et al., "Development of a "smart" workstation for use in mammography", Proceedings of SPIE, (1991), 45: 101-103.
Hologic, "Lorad StereoLoc II" Operator's Manual 9-500-0261, Rev. 005, 2004, 78 pgs.
Hologic, Inc., 510(k) Summary, prepared Nov. 28, 2010, for Affirm Breast Biopsy Guidance System Special 510(k) Premarket Notification, 5 pages.
Hologic, Inc., 510(k) Summary, prepared Aug. 14, 2012, for Affirm Breast Biopsy Guidance System Special 510(k) Premarket Notification, 5 pages.
ICRP Publication 60: 1990 Recommendations of the International Commission on Radiological Protection, 12 pages.
Japanese Notice of Final Rejection in Application 2016-526115, mailed Jun. 24, 2019, 5 pages.
Jochelson M., et al, "Bilateral Dual Energy contrast-enhanced digital mammography: Initial Experience", RSNA 2010, 96th Scientific Assembly and Scientific Meeting, 1 page.
Jong, RA, et al., Contrast-enhanced digital mammography: initial clinical experience. Radiology 2003; 228:842-850.
Koechli, Ossi R., "Available Sterotactic Systems for Breast Biopsy", Renzo Brun del Re (Ed.), Minimally Invasive Breast Biopsies, Recent Results in Cancer Research 173:105-113; Springer-Verlag, 2009.
Kopans, et.al. Will tomosynthesis replace conventional mammography? Plenary Session SFN08: RSNA 2005.
Lehman CD, et al. MRI evaluation of the contralateral breast in women with recently diagnosed breast cancer. N Engl J Med 2007; 356:1295-1303.
Lewin JM, et al., Dual-energy contrast-enhanced digital subtraction mammography: feasibility. Radiology 2003; 229:261-268.
Lindfors KK, et al., Dedicated breast CT: initial clinical experience. Radiology 2008; 246(3): 725-733.
Niklason, L., et al., Digital tomosynthesis in breast imaging. Radiology. Nov. 1997; 205(2):399-406.
Observations by Third Party, Remarks concerning European patent application No. 10707751.3 according to Article 115 EPC, dated Apr. 24, 2014, 8 pgs.
PCT Feb. 20, 2008 International Search Report and Written Opinion in connection with corresponding International patent application No. PCT/US2007/04006, 7 pgs.
PCT International Preliminary Report on Patentability in International Application PCT/US2014/061994, mailed Apr. 26, 2016, 5 pages.
PCT International Search Report and Written Opinion in Application PCT/US2010/025873, dated Aug. 2, 2010, 19 pgs.
PCT International Search Report in Application PCT/US2014/026164, mailed Jul. 28, 2014, 1 page.
PCT International Written Report for International Application PCT/US2014/026164, mailed Jul. 28, 2014, 2 pgs.
PCT Written Opinion in International Application PCT/US2014/061994, mailed Jan. 22, 2015, 4 pages.
PCT/US12/28334 International Search Report and Written Opinion, dated Jul. 5, 2012, 7 pages.
Poplack SP, et al, Digital breast tomosynthesis: initial experience in 98 women with abnormal digital screening mammography. AJR Am J Roentgenology Sep. 2007 189(3):616-23.
Prionas ND, et al., Contrast-enhanced dedicated breast CT: initial clinical experience. Radiology. Sep. 2010 256(3):714-723.
Rafferty E. et al., "Assessing Radiologist Performance Using Combined Full-Field Digital Mammography and Breast Tomosynthesis Versus Full-Field Digital Mammography Alone: Results. . . " presented at 2007 Radiological Society of North America meeting, Chicago IL.
Reynolds, April, "Stereotactic Breast Biopsy: A Review", Radiologic Technology, vol. 80, No. 5, Jun. 1, 2009, pp. 447M-464M, XP055790574.
Shrading, Simone et al., "Digital Breast Tomosynthesis-guided Vacuum-assisted Breast Biopsy: Initial Experiences and Comparison with Prone Stereotactic Vacuum-assisted Biopsy", the Department of Diagnostic and Interventional Radiology, Univ. of Aachen, Germany, published Nov. 12, 2014, 10 pgs.

(56) References Cited

OTHER PUBLICATIONS

Smith, A., Full field breast tomosynthesis. Radiol Manage. Sep.-Oct. 2005; 27(5):25-31.
Weidner N, Semple JP, Welch WR, Folkman J. Tumor angiogenesis and metastasis: correlation in invasive breast carcinoma. New England Journal of Medicine 1991; 324:1-8.
Weidner N, The importance of tumor angiogenesis: the evidence continues to grow. AM J Clin Pathol. Nov. 2004 122(5):696-703.
Blane, C. et al., "New Compression Paddle for Wire Localization in Mammography", Academic Radiology, 17(2): 142-145 (2010).
Bram Van Ginneken, Computer-aided Diagnosis in Chest Radiography Thesis, Image Sciences Institute, University Medical Center Utrecht, Utrecht, Netherlands, 2001.
Carson, P. et al., "Local compression in automated breast ultrasound in the mammographic geometry", Ultrasonics Symposium, 1787-1790 (2010).
Gutierrez et al., "Multimodality image guidance system integrating X-ray fluoroscopy and ultrasound image streams with electromagnetic tracking", Medical Imaging 2007: Visualization and Image-Guided Procedures, Proc. of SPIE vol. 6509, 2007, pp. 1-10.
Vaartjes, S.E. et al., "First clinical trials of the twente photoacoustic mammoscope (PAM)", Visual Communications and Image Processing; Jan. 20, 2004, San Jose, CA, UDS, vol. 6629, Jan. 1, 2007, pp. 1-12.
Al Sallab et al., "Self Learning Machines Using Deep Networks", Soft Computing and Pattern Recognition (SoCPaR), 2011 Int'l. Conference of IEEE, Oct. 14, 2011, pp. 21-26.
Caroline, B.E. et al., "Computer aided detection of masses in digital breast tomosynthesis: A review", 2012 International Conference on Emerging Trends in Science, Engineering and Technology (INCOSET), Tiruchirappalli, 2012, pp. 186-191.
Chan, Heang-Ping et al., "ROC Study of the effect of stereoscopic imaging on assessment of breast lesions," Medical Physics, vol. 32, No. 4, Apr. 2005, 1001-1009.
EFilm Mobile HD by Merge Healthcare, web site: http://itunes.apple.com/bw/app/efilm-mobile-hd/id405261243?mt=8, accessed on Nov. 3, 2011 (2 pages).
EFilm Solutions, eFilm Workstation (tm) 3.4, website: http://estore.merge.com/na/estore/content.aspx?productID=405, accessed on Nov. 3, 2011 (2 pages).
Ertas, M. et al., "2D versus 3D total variation minimization in digital breast tomosynthesis", 2015 IEEE International Conference on Imaging Systems and Techniques (IST), Macau, 2015, pp. 1-4.
Ghiassi, M. et al., "A Dynamic Architecture for Artificial Networks", Neurocomputing, vol. 63, Aug. 20, 2004, pp. 397-413.
Lilja, Mikko, "Fast and accurate voxel projection technique in free-form cone-beam geometry with application to algebraic reconstruction," Applies Sciences on Biomedical and Communication Technologies, 2008, Isabel '08, first international symposium on, IEEE, Piscataway, NJ, Oct. 25, 2008.
Pathmanathan et al., "Predicting tumour location by simulating large deformations of the breast using a 3D finite element model and nonlinear elasticity", Medical Image Computing and Computer-Assisted Intervention, pp. 217-224, vol. 3217 (2004).
Pediconi, "Color-coded automated signal intensity-curve for detection and characterization of breast lesions: Preliminary evaluation of new software for MR-based breast imaging," International Congress Series 1281 (2005) 1081-1086.
Sakic et al., "Mammogram synthesis using a 3D simulation. I. breast tissue model and image acquisition simulation" Medical Physics. 29, pp. 2131-2139 (2002).
Samani, A. et al., "Biomechanical 3-D Finite Element Modeling of the Human Breast Using MRI Data", 2001, IEEE Transactions on Medical Imaging, vol. 20, No. 4, pp. 271-279.
Wodajo, Felasfa, MD, "Now Playing: Radiology Images from Your Hospital PACS on your iPad," Mar. 17, 2010; web site: http://www.imedicalapps.com/2010/03/now-playing-radiology-images-from-your-hospital-pacs-on-your-ipad/, accessed on Nov. 3, 2011 (3 pages).
Yin, H.M., et al., "Image Parser: a tool for finite element generation from three-dimensional medical images", BioMedical Engineering Online. 3:31, pp. 1-9, Oct. 1, 2004.
Choi Bareum et al., "Surgical-tools detection based on Convolutional Neural Network in laparoscopic robot-assisted surgery", 2017 39th Annual International Conference of the IEEE Engineering in Medicine and Biology Society (EMBC), IEEE, Jul. 11, 2017, pp. 1756-1759.
Han et al., "MatchNet: Unifying Feature and Metric Learning for Patch-Based Matching", 2015 IEEE Conference on Computer Vision and Pattern Recognition (CVPR), Boston, MA, 2015, pp. 3279-3286.
Yuan, Yading et al., "Correlative feature analysis on FFDM", Medical Physics, vol. 35, No. 12, Nov. 13, 2008, pp. 5492-5494.
Van Schie, Guido, et al., "Mass detection in reconstructed digital breast tomosynthesis volumes with a computer-aided detection system trained on 2D mammograms", Med. Phys. 40(4), Apr. 2013, 41902-1-41902-11.
Van Schie, Guido, et al., "Generating Synthetic Mammograms from Reconstructed Tomosynthesis Volumes", IEEE Transactions on Medical Imaging, vol. 32, No. 12, Dec. 2013, 2322-2331.

\* cited by examiner

SYSTEMS AND METHODS FOR USING AI TO IDENTIFY REGIONS OF INTEREST IN MEDICAL IMAGES

CROSS-REFERENCE TO RELATED APPLICATION

This application claims priority to and the benefit of U.S. Provisional Application No. 63/116,162, filed on Nov. 20, 2020, entitled "Systems and Methods for Using AI to Identify Regions of Interest in Medical Images," the disclosure of which is hereby incorporated by reference in its entirety.

BACKGROUND

In the realm of artificial intelligence (AI), deep learning enables systems to automatically discover the information required to perform feature detection or classification using raw data. Deep learning requires access to large amounts of accurately labeled data. Typically, the data labeling is primarily a manual process, which can be prohibitively costly in terms of time and human/financial resources. Moreover, data privacy concerns are often a consideration.

It is with respect to these and other general considerations that the aspects disclosed herein have been made. Also, although relatively specific problems may be discussed, it should be understood that the examples should not be limited to solving the specific problems identified in the background or elsewhere in the present disclosure.

SUMMARY

Examples of the present disclosure describe systems and methods for using AI to identify regions of interest (ROI) in medical images. A system and methods for using AI to identify Regions of Interest (ROI) in medical images is provided. In aspects, the system comprises a processor; and memory coupled to the processor, the memory comprising computer executable instructions that, when executed, perform a method comprising detecting, by an orchestration engine in a second environment, a request to train an algorithm to identify the ROI, wherein the request is provided from a first environment external to the second environment, wherein the first environment is firewalled and physically isolated from the second environment, receiving an algorithm container for the algorithm, wherein the algorithm container comprises one or more data objects for the algorithm, identifying, in a ROI repository in the second environment, content related to the algorithm container, wherein the content comprises one or more images of the ROI, training, by a training engine in the second environment, a model using the content, and providing the trained model to the first environment, wherein the first environment further includes a user interface allowing a user to identify an algorithm to be trained at the second environment.

In various embodiments, the first environment is a distributed computing environment and the second environment is a healthcare facility. The first environment comprises patient medical data that includes Protected Health Information (PHI) secured and encrypted at the first environment. The model in the second environment is an NLP-based model trained at the second environment with patient medical data only contained in the second environment.

In some embodiments, the content related to the algorithm container comprises content generated by the NLP-based model stored at the second environment. The first environment comprises a model repository configured to store multiple trained models, wherein the trained model is stored at the model repository and is accessible by the user. Further comprising, identifying one or more identifiers associated with the received algorithm container. The identifiers are used to search the ROI repository for content related to the algorithm container. In other embodiments, a plurality of second environments each receiving a request to train the algorithm to identify the ROI are described. The plurality of second environments each providing the trained model to the first environment.

Alternatively or additionally, a system for using AI to identify ROI in medical images is described. The system comprising a processor; and memory coupled to the processor, the memory comprising computer executable instructions that, when executed, perform a method. The method comprising receiving, by an application in a first environment, a request to train an algorithm to identify the ROI, providing, to a second environment, an algorithm container for the algorithm, wherein the algorithm container comprises one or more data objects for the algorithm, receiving a trained model from the second environment, wherein the trained model is based on the algorithm container, and evaluating performance metrics of the trained model using a test operating environment of the second environment.

In various aspects, the first environment further includes a user interface allowing a user to identify an algorithm to be trained at the second environment. The first environment comprises a model repository configured to store multiple trained models, wherein the trained model is stored at the model repository and is accessible by the user. The evaluating performance metrics further includes identifying performance metrics for the trained model and comparing the identified performance metrics to a set of baseline performance metrics. As the result of evaluating the trained model, an updated algorithm container is determined. Further including providing the trained model and the updated algorithm container to the second environment. In such aspects, the updated algorithm container comprises an updated set of parameters for training the trained model and the second environment is configured to update the trained model. In addition, the updated trained model may be provided to the first environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
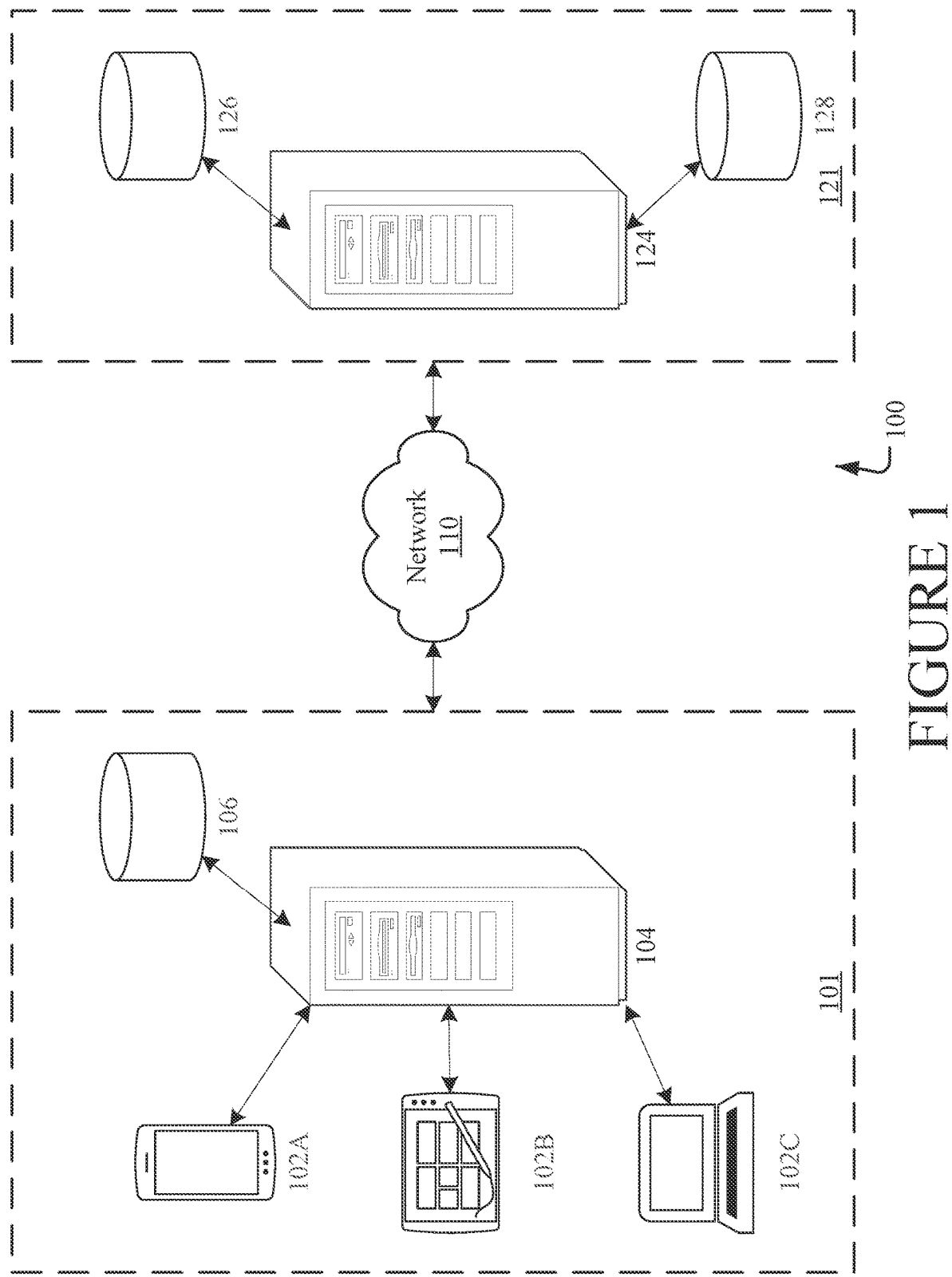
FIG. 1 illustrates an overview of an example system for using AI to identify ROI in medical images, as described herein.

Medical imaging has become a widely used tool for identifying and diagnosing abnormalities, such as cancers or other conditions, within the human body. Medical imaging processes such as mammography and tomosynthesis are particularly useful tools for imaging breasts to screen for, or diagnose, cancer or other lesions with the breasts. Tomosynthesis systems are mammography systems that allow high resolution breast imaging based on limited angle tomosynthesis. Tomosynthesis, generally, produces a plurality of X-ray images, each of discrete layers or slices of the breast, through the entire thickness thereof. In contrast to conventional two-dimensional (2D) mammography systems, a tomosynthesis system acquires a series of X-ray projection images, each projection image obtained at a different angular displacement as the X-ray source moves along a path, such as a circular arc, over the breast. In contrast to conventional computed tomography (CT), tomosynthesis is typically based on projection images obtained at limited angular displacements of the X-ray source around the breast. Tomosynthesis reduces or eliminates the problems caused by tissue overlap and structure noise present in 2D mammography imaging.

In recent times, artificial intelligence (AI) has been increasingly used to evaluate the image data generated using medical imaging. In particular, machine learning methods, such as deep learning, provide powerful tools for evaluating image data. Although such tools are highly accurate and efficient, these tools must be trained to perform specific tasks. The training requires access to a large amount of accurately labeled data. Generally, the data labeling process is performed manually. For example, a clinical professional must read medical report documents (physician notes, radiology reports, biopsy reports, etc.) to identify ROI associated with a patient. The clinical professional labels the identified ROI on medical images associated with the medical documents. Often, the quality of the labeling varies among clinical professionals based on various factors, such as experience, ability, fatigue, etc. The labeled medical images are provided as input to an AI component. Based on the input, the AI component is trained to identify the labeled ROI in medical images subsequently provided to the trained AI component. When the clinical professional intends to train the AI component to identify a new ROI or a new aspect of a ROI for which the AI component was previously trained, the entire process must be repeated. Thus, the data labeling process is often time-consuming, cumbersome, expensive, and potentially inaccurate.

In addition, the large amount of accurately labeled data includes patient records and other sensitive physical information that is protected by various laws and regulations including data security and protection and confidential handling of protected health information. As such, to comply with the laws and regulations, the data for purposes of labeling must first be deidentified by removing identification of a particular patient prior to the export of data from a medical facility. Such deidentification is time consuming and often done manually.

To address such issues with data labeling for AI training, the present disclosure describes systems and methods for using AI to identify ROI in medical images. In aspects, a first computing environment may comprise sensitive physical and/or electronic data, such as the medical report data, medical images, patient records, and other hospital information system (HIS) data. The first computing environment may correspond to a healthcare facility or a section or department of a healthcare facility. At least a portion of the medical report data and/or medical images may be provided as input to a first service or application in the first computing environment. The first service or application may use the input to train an AI model or algorithm to identify ROI within the medical images based on the medical report data. In at least one example, the model or algorithm may use NLP techniques to identify language that describes the locations of findings in the medical report data. The model or algorithm may use the identified language to provide output including image overlays for the medical images or annotated versions of the medical images that include labeled locations of the findings identified by the identified language. The labeled locations may include textual labels, numerical values, highlighting, encircling (and/or other types of content enclosing), arrows or pointers, font or style modifications, etc. The output of the model or algorithm may be stored in at least one data repository in the first computing environment. The data repository may also store one or more portions of the medical report data and/or the patient records.

In aspects, a second computing environment may include a second service or application for training and storing user-requested models or algorithms. The second computing environment may be physically and logically separate from the first computing environment. In response to receiving a request to train a user-requested model or algorithm, the second service or application may provide data objects and/or training requirements for the requested user-specific model or algorithm to a training component in the first computing environment. The training component may search the data repository to identify information relevant to the requested user-specific model or algorithm. The training component may use the identified information to train the requested user-specific model or algorithm. The trained user-specific model or algorithm may be provided to the second service or application in the second computing environment without allowing the second computing environment access to the sensitive data in the first computing environment. Thus, the integrity and security of the sensitive data may be maintained throughout the training process. Upon receiving the trained user-specific model or algorithm, the second service or application may evaluate the model to determine a set of performance metrics. The set of performance metrics may represent the accuracy or effectiveness of the trained user-specific model or algorithm. In at least one aspect, the second service or application may use the set of performance metrics to iteratively tune/train the trained user-specific model or algorithm.

Accordingly, the present disclosure provides a plurality of technical benefits including but not limited to: training an NLP-based model to detect text relating to ROI locations, using NLP-based model output to train specific AI models, improving data security/privacy during model creation, improving the accuracy of labeled data, improving the efficiency of generating labeled data, enabling self-learning AI systems within client or sensitive environments.

FIG. 1 illustrates an overview of an example system for using AI to identify regions of interest (ROI) in medical images as described herein. Example system 100 as presented is a combination of interdependent components that interact to form an integrated system. Components of system 100 may be hardware components or software components implemented on and/or executed by hardware components of the system. System 100 may provide one or more operating environments for software components to execute according to operating constraints, resources, and facilities of system 100. In one example, the operating environment(s) and/or software components may be provided by a single processing device, as depicted in FIG. 6. In another example, the operating environment(s) and software components may be distributed across multiple devices. For instance, input may be entered on a user device and information may be processed or accessed using other devices in a network, such as one or more network devices and/or server devices.

As one example, system 100 comprises environments 101 and 121 and network 110. One of skill in the art will appreciate that the scale of systems such as system 100 may vary and may include more or fewer environments and/or components than those described in FIG. 1. For instance, in some examples, at least a portion of the functionality and components of environments 101 and 121 may be integrated into a single environment, processing system, or device. Alternately, the functionality and components of environments 101 and/or 121 may be distributed across multiple environments or processing systems.

Environment 101 may comprise user devices 102A, 102B, and 102C (collectively "user devices 102"), server device 104, and data store(s) 106. In at least one aspect, environment 101 may represent a cloud-based or distributed computing environment. User devices 102 may be configured to receive or collect input from one or more users or alternate devices. Examples of user devices 102 include, but are not limited to, personal computers (PCs), server devices, mobile devices (e.g., smartphones, tablets, laptops, personal digital assistants (PDAs)), and wearable devices (e.g., smart watches, smart eyewear, fitness trackers, smart clothing, body-mounted devices). User devices 102 may include sensors, applications, and/or services for receiving or collecting input. Example sensor include microphones, touch-based sensors, keyboards, pointing/selection tools, optical/magnetic scanners, accelerometers, magnetometers, gyroscopes, etc. The collected input may include, for example, voice input, touch input, text-based input, gesture input, video input, and/or image input.

Server device 104 may be configured to receive collected input from user devices 102. Examples of server device 104 include, but are not limited to, application servers, web servers, file servers, database servers, and mail servers. Upon receiving collected input, server device 104 may provide access to data and one or more services/applications. The data and services/applications may be stored remotely from server device 104 and accessed by server device 104 via network 110. Alternately, the data and services/applications may be stored and accessed locally on server device 104 using a data store, such as data store(s) 106. Examples of data store(s) 106 include, but are not limited to, databases, file systems, directories, flat files, and email storage systems. In some aspects, data store(s) 106 may comprise data objects and/or sets of instructions for one or more algorithms and/or models. A model, as used herein, may refer to a predictive or statistical utility or program that may be used to determine a probability distribution over one or more character sequences, classes, objects, result sets or events, and/or to predict a response value from one or more predictors. A model may be based on, or incorporate, one or more rule sets, machine learning (ML), a neural network, or the like. In at least one aspect, the algorithms and/or models may be proprietary and/or subject to trade secret protections by the owners of the algorithms and/or models.

The algorithms and/or models in data store(s) 106 may be used to perform one or more specific tasks, such as identifying a type of cancer, a category of disease, image anomalies, etc. Although reference to specific types of tasks are described herein, it is contemplated that the algorithms and/or models may be used to perform alternate types of tasks and used in alternate types of environments. In response to receiving the collected input, server device 104 may collect or receive one or more data objects and/or sets of instructions relating to a specific task or set of tasks from data store(s) 106. Server device 104 may identify a task and/or corresponding data objects/instructions based on one or more terms in or associated with the collected input. For example, server device 104 may parse the collected input to identify query terms or input terms. The identified terms may be used to search the data (e.g., algorithm names, data object text, instruction text) in data store(s) 106 for similar or matching terms using search techniques, such as pattern matching, regular expressions, fuzzy matching, etc. When one or more matches are identified, the corresponding algorithm(s)/model(s) may be selected and server device 104 may collect or receive one or more data objects and/or sets of instructions relating to the selected algorithm(s)/model(s). Server device 104 may provide one or more data objects and/or sets of instructions to environment 121 based on the collected input.

Server device 104 may be further configured to evaluate response data received from environment 121. The response data may be provided by environment 121 in response to one or more data objects and/or sets of instructions provided to environment 121. In aspects, server device 104 may comprise or provide access to an execution environment (not pictured). The execution environment may comprise or utilize functionality for evaluating the response data. In at least one aspect, the response data corresponds to a trained user-requested model or algorithm. The evaluated response data may be stored in one or more data stores, such as data store(s) 106. The response data may be provided to a user in response to receiving the collected input.

Environment 121 may comprise server device 124, data store(s) 126, and feature store(s) 128. In at least one aspect, environment 121 may represent a computing environment comprising sensitive data, such as a healthcare computing environment comprising patient data. Server device 124 may be configured to collect data from the one or more data sources, such as data store(s) 126 and/or feature store(s) 128. Examples of data store(s) 126 and feature store(s) 128 include, but are not limited to, databases, file systems, directories, flat files, and email storage systems. In at least one aspect, the collected data may correspond to medical report data, medical images, patient records, and/or other sensitive medically related information. The collected data may be used to train an NLP-based algorithm or model (not pictured). At least a portion of the output of the trained NLP-based algorithm or model and/or the collected data may be stored in feature store(s) 128.

Server device 124 may be further configured to receive one or more data objects and/or sets of instructions from environment 101. Server device 124 may identify a specific task associated with the received one or more data objects and/or sets of instructions. The identified specific task may be used to search feature store(s) 128 for stored data relevant to performing the specific task. In at least one aspect, the stored data may correspond to labeled or annotated image data, text terms or phrases from medical report data, and/or feature data associated with image data or medical report data. Stored data identified to be relevant may be provided to a training component (not pictured) within environment 121. The training component may be a hardware device, a software component within server device 124, or a software component within a separate hardware device of environment 121. In examples, the training component may be implemented as a black box that provides separation between environment 101 and environment 121. The separation may prevent environment 101 (and other environments external to environment 121) from accessing the sensitive data of environment 121 from outside of environment 121. The separation may also prevent environment 121 from unauthorized access of the models and/or algorithms stored in data store(s) 106. For instance, as the models and/or algorithms may be proprietary to owners who are third parties with respect to environment 101, it may be desirable for the owners to keep the algorithms secure from users in environment 101.

The training component may be configured to train a user-requested model or algorithm. In examples, the stored data identified to be relevant may be provided to the training component. The training component may use the relevant stored data to train a user-requested model or algorithm that is operable to perform the identified specific task. The trained user-requested model or algorithm may then be provided as response data to environment 101. In aspects, the user-requested model or algorithm may be trained and provided to environment 101 such that sensitive data in environment 121 is not exposed to environment 101. As such, the patient data that is located in any sensitive medically related information used to train the trained user-requested model or algorithm does not need to be de-identified because it is not removed from the environment 101 and stays on site in the environment 101. This results in saving significant time from gathering, processing, exporting and storing information, which previously may have been done manually by a highly skilled medical technician.

Figure 2:
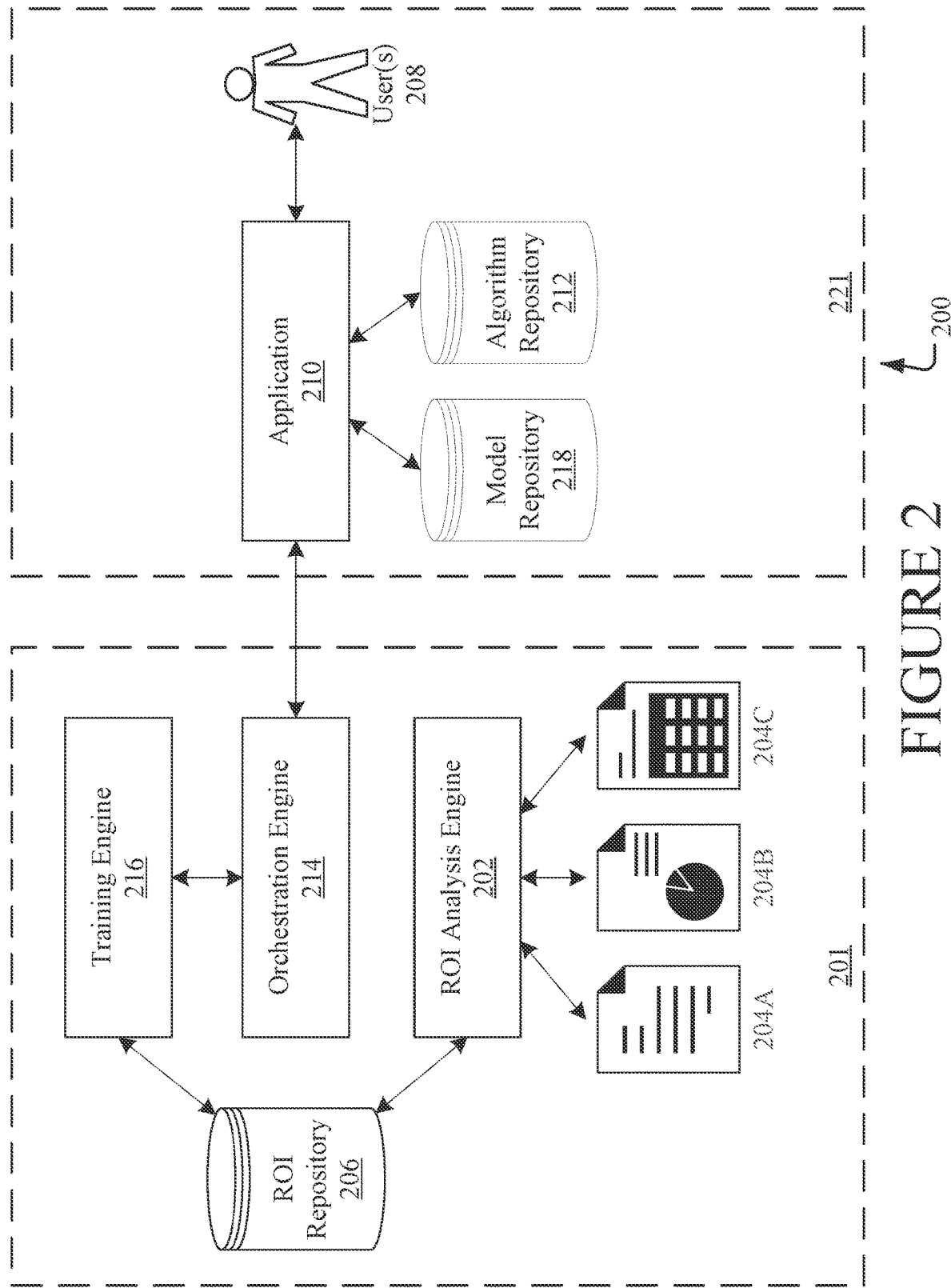
FIG. 2 is a diagram of an example process flow for using AI to identify ROI in medical images, as described herein.

FIG. 2 is a diagram of an example process flow for using AI to identify regions of interest (ROI) in medical images, as described herein. Process flow 200, as presented, comprises environments 201 and 221. In examples, environment 201 may represent a healthcare facility, such as a hospital, an imaging and radiology center, an urgent care facility, a medical clinic or medical offices, an outpatient surgical facility, a physical rehabilitation center, etc. Environment 201 may comprise sensitive or private information associated with a healthcare facility, healthcare patients, and/or healthcare personnel. For example, the patient medical data comprises Protected Health Information (PHI). Environment 221 may represent a web-based, cloud-based, or distributed computing environment associated with environment 201. Environment 221 may be publicly or selectively accessible and may implement security procedures to enable the secure access of environment 201. Generally, environment 221 may not store or have access to sensitive or private information comprised by environment 201. Environments 201 and 221 may be physically and logically separated. In addition, the environment 201 and 221 may be separated by firewalls and authentication protocols ensuring safe handling of the sensitive medical information comprised in the environment 201.

Environment 201 may comprise ROI analysis engine 202, medical data 204A, 204B, and 204C (collectively "medical data 204"), ROI repository 206, orchestration engine 214, and training engine 216. Environment 221 may comprise user(s) 208, application 210, algorithm repository 212, and model repository 218. One of skill in the art will appreciate that the number and type of environments and/or components associated with environment 201, environment 221, and process flow 200 may vary from those described in FIG. 2.

In aspects, ROI analysis engine 202 may be provided, or may have access to, medical data associated with one or more patients, such as medical data 204. ROI analysis engine 202 may be configured to identify ROI associated with medical data 204. Examples of medical data 204 include, but are not limited to, medical report data 204A (e.g., radiology reports, biopsy reports, audio reports, healthcare professional notes and documents), medical image data 204B (e.g., X-ray images, CT images, MRI images, ultrasound images), and electronic medical record (EMR) data 204C (e.g., patient records, medical and treatment history information, patient health data). Although specific references to medical data and procedures are described, it is contemplated that the systems and methods described herein may be implemented with alternate types of data, procedures, and environments.

Upon receiving the medical data, ROI analysis engine 202 may use medical data 204 to train an AI model/algorithm (not pictured) within environment 201. The AI model/algorithm may be stored by ROI analysis engine 202 or elsewhere within environment 201. The AI model/algorithm may be configured to identify ROI within the medical image data based on corresponding medical report data. For example, the AI model/algorithm may implement NLP techniques to identify text and/or speech in medical report data that describes the locations of one or more findings within the patient. The AI model/algorithm may use the identified text and/or speech to identify the findings in corresponding medical image data. The AI model/algorithm may label the identified finding within the medical image data by generating image overlays or annotated versions of the medical image data. The medical image data labeled by the AI model/algorithm, image feature data relating to the medical image data, and the corresponding identified text and/or speech may be stored in a data store, such as ROI repository 206.

After the AI model/algorithm had been trained, a user in or interfacing with environment 221, such as user(s) 208, may access application 210. Examples of user(s) 208 may include one or more manufacturers of algorithms designed to detect different types of medical conditions or abnormalities, such as cancers which may be diagnosed by healthcare professionals from medical images. Application 210 may be configured to receive, store, and/or process user requests to train a user-specific algorithm to perform a specific task. Upon receiving a request from user(s) 208 to train a new user-specific algorithm, application 210 may access algorithm repository 212. Algorithm repository 212 may be configured to store and provide various algorithms relating to environment 201. The algorithms of algorithm repository 212 may relate to various topics, concepts, or areas. For example, a first algorithm may be used to identify a first type of cancer, a second algorithm may be used to identify a second type of cancer, and a third algorithm may be used to identify images having poor image quality. Algorithm repository 212 may be configured to store and provide data objects and/or instructions for training the stored algorithms. Algorithms in the algorithm repository 212 may be proprietary and subject to trade secret protections. It may be desirable for the owners of the algorithms to keep the algorithms secure. As discussed above, environments 221 and 201 may be physically and logically separated and protected by firewalls and other security measures. By separating the environments 221 and 201 access to the algorithms is secured and can be managed by the owners as they reside in the environments subject to the owners' control.

Application 210 may use terms and keywords in the request from user(s) 208 to identify a context (e.g., a topic, a concept, or an area) associated with the request. Application 210 may use the identified context to search algorithm repository 212 for relevant algorithms. When a relevant algorithm is identified in algorithm repository 212, the identified algorithm, one or more data objects, and/or instructions for training the identified algorithm may be provided to orchestration engine 214. In some examples, orchestration engine 214 may be configured to monitor environment 221 and/or application 210 to detect when a user request to train a user-specific algorithm is received by application 210. The monitoring may include the implementation of monitoring services or software used to transmit periodic queries to application 210, receive notifications from application 210, intercept messages between users(s) 208 and application 210, etc. When a user request to train a user-specific algorithm is detected, orchestration engine 214 may cause algorithm repository 212 to provide the identified algorithm, one or more data objects, and/or instructions for training the identified algorithm to orchestration engine 214 and/or training engine 216. For example, orchestration engine 214 may request the access path and/or credentials for algorithm repository 212. Orchestration engine 214 may use the access path and/or credentials to retrieve the identified algorithm, data objects, and/or instructions. Alternately, orchestration engine 214 may provide the access path and/or credentials to training engine 216 and training engine 216 may use the access path and/or credentials to retrieve the identified algorithm, data objects, and/or instructions.

Orchestration engine 214 and/or training engine 216 may also be configured to initiate the training of the identified algorithm within environment 201. Orchestration engine 214 may provide the identified algorithm, one or more data objects, and/or instructions for training the identified algorithm to training engine 216. Alternately or additionally, orchestration engine 214 may provide a command (including parameters) for initiating the training of the identified algorithm to the training engine 216. Training engine 216 may be configured to search ROI repository 206 for data (e.g., medical image data, image feature data, identified text and/or speech) associated with the identified algorithm, and to train a model based on the data. In aspects, training engine 216 may be implemented in a manner that provides separation between environment 201 and environment 221. For example, training engine 216 may prevent users and devices in environment 221 (and other environments external to environment 201) from accessing the sensitive or secure data of environment 201, such as medical data 204, from outside of environment 201. Further, training engine 216 may prevent users and devices in environment 201 (and other environments external to environment 221) from directly accessing the algorithms stored in algorithm repository 212. For instance, training engine 216 may implement security features or policies that prevent users and devices in environment 201 and environment 221 from viewing or accessing the data (e.g., ROI repository 206 data or algorithm repository 212) received by training engine 216.

Upon receiving the identified algorithm, one or more data objects, instructions for training the identified algorithm, and/or command (including parameters) for initiating the training of the identified algorithm, training engine 216 may train a model based on the identified algorithm. When the model has been trained, orchestration engine 214 or training engine 216 may provide the trained model to model repository 218. Alternately, orchestration engine 214 or training engine 216 may provide the trained model to application 210 and application 210 may provide the trained model to model repository 218. Model repository 218 may be configured to store various trained models and associated data, such as creation/modification data, a description of the model, testing data, result accuracy data, keywords or terms associated with the model, version/iteration number, etc.

In aspects, after the trained model has been provided to model repository 218 and/or application 210, user(s) 208 may interact with the trained model using application 210. For example, application 210 may also be configured to provide a testing environment (not pictured) to test the trained model. The testing environment may implement tools for evaluating the performance metrics for the trained model. In examples, the performance metrics may relate to receiver operating characteristics (ROCs) and/or free-response receiver operating characteristics (FROCs), such as sensitivity, specificity, precision, hit rate, accuracy, etc. Evaluating the performance metrics for the trained model may include using the trained model to perform a specific task intended by the user and/or comparing the performance metrics for the trained model to a set of baseline performance metrics. For example, the trained model may be used to identify image data or aspects thereof. Based on the performance metrics for the trained model, the trained model may be provided to training engine 216, as described above, to be refined/retrained. A set of training parameters may for refining/retraining may also be provided to training engine 216. Training engine 216 may refine/retrain the trained model based on the set of training parameters. The refined/retrained model may be provided to application 210 and/or model repository 218. The testing environment of application 210 may be used to evaluate the performance metrics of the refined/retrained model. In some aspects, the performance metrics of trained model and the refined/retrained model may be compared to determine whether the trained model or the refined/retrained model is more accurate. Based on the comparison, the trained model and/or the refined/retrained model may be stored or removed from the model repository 218. Additionally, the refined/retrained model may be further refined/retrained using the process described above.

In some embodiments, multiple environments, such as environments 201A, B and C, may be accessible to the environment 221. Each of the environments 201A, B and C comprises sensitive or private information such as patient medical data comprising PHI. Environments 201A, B, C are be physically and logically separated from each other, each is physically and logically separated from environment 221. In addition, the environment 201 and 221 may be separated by firewalls and authentication protocols ensuring safe handling of the sensitive medical information comprised in the environments 201A, B and C.

Having described a system and process flow that may employ the techniques disclosed herein, the present disclosure will now describe one or more methods that may be performed by various aspects of the present disclosure. In aspects, methods 300 and 400 may be executed by a system, such as system 100 of FIG. 1. However, methods 300 and 400 are not limited to such examples. In other aspects, methods 300 and 400 may be performed by a single device comprising multiple computing environments. In at least one aspect, methods 300 and 400 may be executed (e.g., computer-implemented operations) by one or more components of a distributed network, such as a web service/distributed network service (e.g. cloud service).

Figure 3:
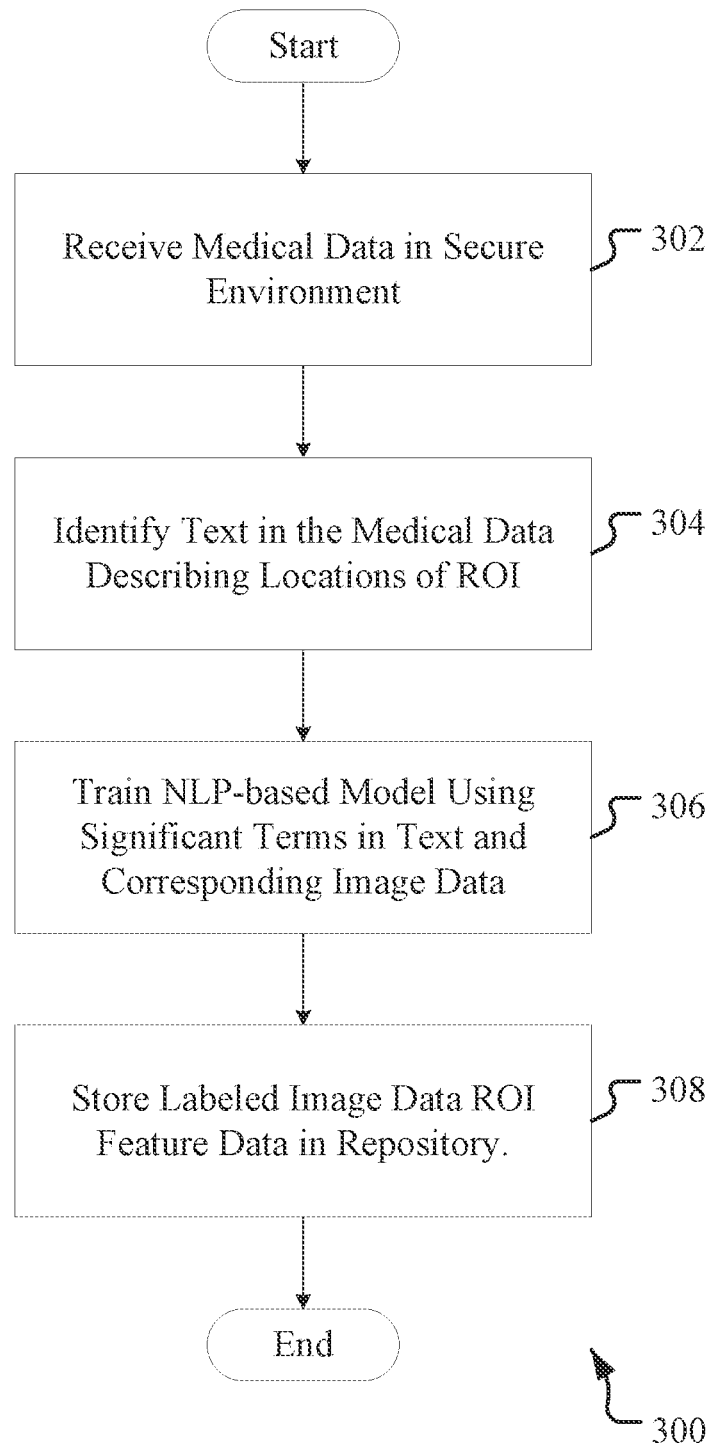
FIG. 3 illustrates an example method for training an NLP-based model to generate medical images comprising labeled ROI, as described herein

FIG. 3 illustrates an example method for training an NLP-based model to generate images comprising labeled ROI, as described herein. Example method 300 begins at operation 302, where medical data may be received. In aspects, an analysis component, such as ROI analysis engine 202, may be located in a secure environment, such as environment 201. The secure environment may correspond to a client environment of a healthcare facility or of another location comprising sensitive data. The analysis component may receive or have access to medical data from one or more sources, such as data store(s) 106. The medical data may include medical report data, medical image data, EMR data, and other HIS data.

At operation 304, text describing the location of ROI may be identified. In aspects, the analysis component may apply one or more NLP techniques to the medical data. Example NLP techniques include, but are not limited to, named entity recognition, sentiment analysis, tokenization, sentence segmentation, and stemming and lemmatization. The NLP techniques may be used to identify significant terms and/or phrases in text data of the medical data. The significant terms and/or phrases may correspond to terms and/or phrases of a standardized (or semi-standardized) lexicon used for reporting the outcomes of image review. As one example, the NLP techniques may be applied to medical report data (e.g., radiology reports and/or biopsy reports) to identify text describing one or more findings or ROI (e.g., lesions, asymmetric breast tissue, macrocalcifications, asymmetry density, distortion mass, or adenopathy) resulting from a mammographic exam. The text may include features of the findings or ROI, such as size, location, texture, density, symmetry, etc. As a specific example, the NLP techniques may identify a sentence in a radiology report that indicates a lesion was detected in the superior medial portion of a patient's left breast. The NLP techniques may also identify another sentence in the radiology report that indicates the size and density of the lesion and the approximate location of the lesion with in the superior medial quadrant. The text associated with each sentence may be extracted by the analysis component. The extracted text may be labeled (e.g., superior medial lesion) and stored with text relating to similar findings. For instance, all text describing findings or ROI in the superior medial quadrant of a breast may be stored under the category "Superior Medial Findings."

At operation 306, an NLP-based model may be trained with data located at the environment 201. In at least one embodiment, the NPL-based model is trained with only the medical data 204A, 204B, and 204C at the environment 201. No other data outside the environment 201 is used. In aspects, the significant terms and/or phrases identified in the text data of the medical data (and in other medical data) may be provided as input to an NLP-based model located within the secure environment. The NLP-based model may be generated and/or maintained by the analysis component or by another component within the secure environment. Image data corresponding to the identified significant terms and/or phrases may also be provided as input to an NLP-based model. The input may be used to train the NLP-based model to match the identified significant terms and/or phrases to corresponding locations of ROI in the image data. Matching the identified significant terms and/or phrases to the corresponding locations may include generating labeled image data comprising labels and/or annotations of the ROI. For example, various text strings from a radiology report and one or more corresponding tomosynthesis computer-aided design (CAD) images may be provided to an NLP-based model. In response to the text string "a lesion was detected in the superior medial portion of a patient's left breast," the NLP-based model may evaluate the CAD image(s) to identify images of the patient's left breast. For each identified CAD image of the patient's left breast, the NLP-based model may evaluate the superior medial quadrant of the breast in the CAD image to identify ROI corresponding to the text string. The evaluation may include the use of unified vectors of location features. For each identified ROI, the NLP-based model may label the ROI on the CAD image and/or create a labeled version of the CAD image. For instance, the NLP-based model may generate an overlay in which the identified ROI is encircled or otherwise highlighted.

At operation 308, the NLP-based model data may be stored in a repository. In aspects, content generated or output by the NLP-based model may be stored in a data repository, such as ROI repository 206. The content may include, labeled or otherwise annotated image data, unlabeled/unannotated image data, feature vectors, terms and/or phrases, and/or medical data available to the analysis component. The data repository may also be located in the secure environment such that the NLP-based model may be trained, and the content generated therefrom may be stored without exposing sensitive data to entities outside of the secure environment.

Figure 4:
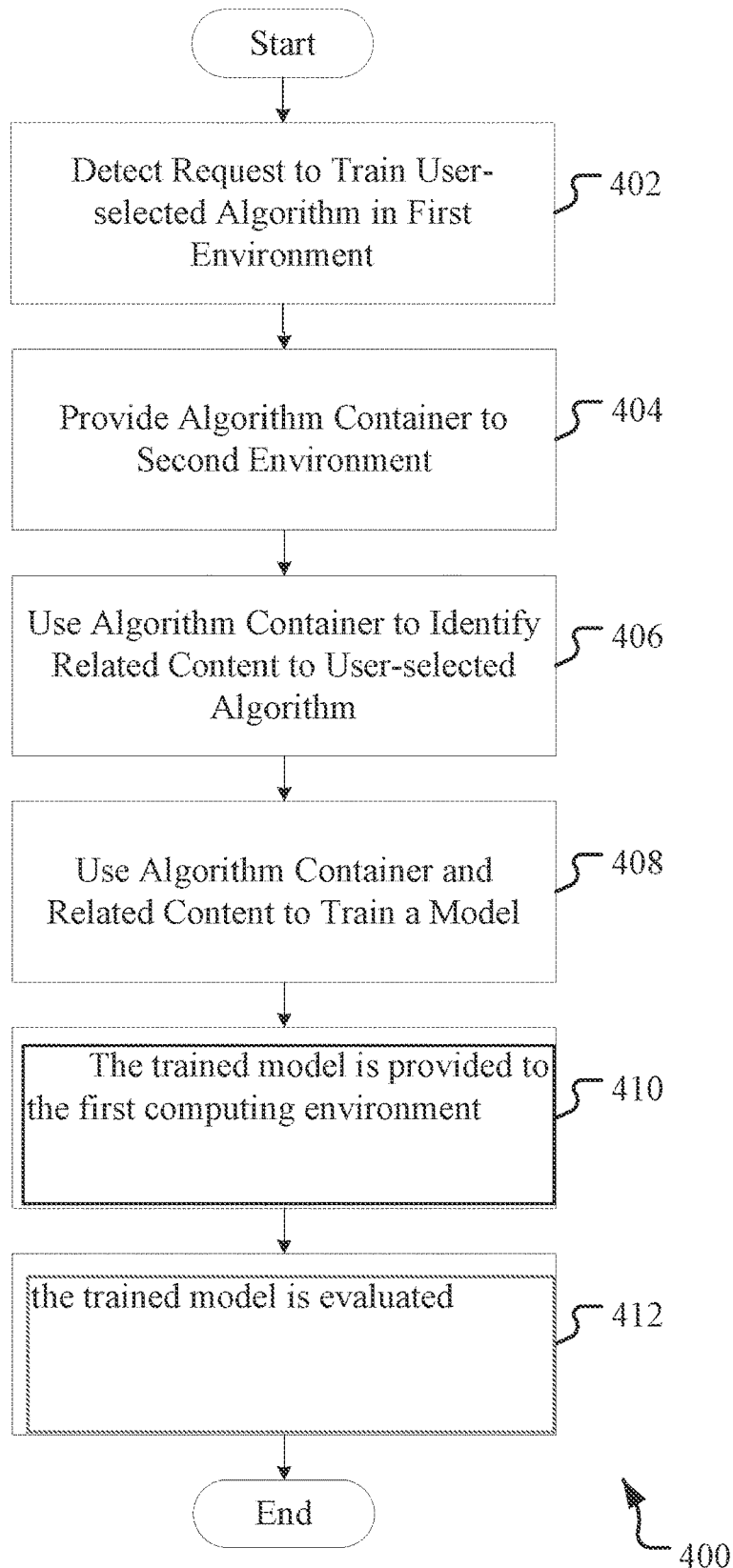
FIG. 4 illustrates an example method for using AI to identify ROI in medical images, as described herein.

FIG. 4 illustrates an example method for using AI to identify ROI in medical images as described herein. In aspects, an application or service providing component ("application component"), such as application 210 may be located in a first computing environment, such as environment 221. The first computing environment may correspond to a cloud-based or web-based environment that may be publicly or selectively accessible. The first computing environment may provide access to a second computing environment, such as environment 201. The second computing environment may correspond to a secure, client environment of a healthcare facility or of another location comprising private or sensitive data.

Example method 400 begins at operation 402, where a request to train a user-selected algorithm is detected. In aspects, a user in or accessing the first computing environment may access a user interface provided by the application component. The user interface may provide the user with an option to identify an algorithm to be trained to perform one or more tasks. Identifying the algorithm may comprise selecting an algorithm from a list of algorithms in an algorithm store, such as algorithm repository 212. Alternately, identifying an algorithm may comprise providing one or more algorithm characteristics (e.g., intended function or type/category) to the user interface. In response to a user identifying an algorithm, the application component may provide the identified algorithm, one or more data objects associated with the identified algorithm, and/or instructions for training the identified algorithm (collectively, "algorithm container").

At operation 404, the algorithm container may be provided to the second computing environment. In some aspects, the application component may send the algorithm container to one or more components in the second computing environment in response to receiving the user request. For example, the application component may send the algorithm container to an algorithm training orchestration component, such as orchestration engine 214, or to an algorithm training component, such as training engine 216. In other aspects, the algorithm training orchestration component of the second computing environment may monitor the application component in the first computing environment. Upon detecting a request to train a user-selected algorithm has been received by the application component, the orchestration component or the algorithm training component may request the algorithm container from the application component or the algorithm store. In response to the request by the orchestration component, the application component may provide the algorithm container to the orchestration component or the algorithm training component. Alternately, the application component may provide information for the algorithm container (e.g., identifier, location/path, access credentials) to the orchestration component or algorithm training component. The orchestration component or algorithm training component may use the information for the algorithm container to retrieve the algorithm container.

At operation 406, the algorithm container may be used to identify content related to the user-selected algorithm. In aspects, one or more identifiers (e.g., terms, phrases, topics, contexts) associated with the received algorithm container may be identified. The identifiers may be used to search a data repository, such as ROI repository 206, for content related (e.g., relevant) to the algorithm container. The content in the data repository may include, for example, labeled or otherwise annotated image data, unlabeled/unannotated image data, ROI feature vectors, terms and/or phrases describing ROI, and/or other medical data available in the second computing environment. Searching the data repository may include using pattern matching techniques, such as regular expressions, fuzzy logic, pattern recognition models, etc. Any content determined to be related to the algorithm container may be identified and extracted from the data repository. As on specific example, an algorithm container for detecting metastatic breast cancer may be titled as or comprise the term "Metastatic." Based on identifying the term "metastatic" in/for the algorithm container, image data comprising ROI that include instances of metastatic breast cancer may be identified.

At operation 408, content related to the algorithm container may be used to train a model. In aspects, the algorithm container and/or the content related to the algorithm container may be provided as input to the training component in the second computing environment. The training component may use the input to train a model corresponding to the algorithm container. For example, the training component may use overlay image data in the related content to populate or otherwise configure one or more data objects in the algorithm container according to a set of instructions and/or parameters in the algorithm container. The populated/configured data objects may be used to construct a model representing the algorithm the user requested to be trained. In examples, the model may be trained such that data used to train the model in the second computing environment is not exposed to the first computing environment.

At operation 410, the trained model may be provided to the first computing environment. In aspects, the orchestration component may receive or collect the trained model from the training component. The orchestration component may provide the trained model to the first computing environment. For example, the orchestration component may provide the trained model to the application component and/or to a model store of the first computing environment, such as model repository 218. Alternately, the training component may provide the trained model to the first computing environment. The trained model may be stored in the model store and/or presented to the user using the user interface. The user interface may enable the user to execute, modify, or otherwise interact with the trained model.

At operation 412, the trained model may be evaluated. In aspects, the first computing environment or a component thereof, such as the application component, may comprise a test operating environment. The test operating environment may provide one or more tools for evaluating the trained model. The evaluation may include identifying performance metrics for the trained model and/or comparing the identified performance metrics to a set of baseline or default performance metrics. In some aspects, the test operating environment may enable the iterative training of a model. For example, after evaluating a trained model in the test operating environment, an updated algorithm container may be manually or automatically selected from the algorithm store or may otherwise be acquired. The updated algorithm container may be selected by, for example, the application component based on predefined testing constraints or according to a test script or executable test file for the selected algorithm or algorithm type. The trained model and the updated algorithm container may be provided to the training component in the second computing environment. The updated algorithm container may comprise an updated set of instructions and/or parameters for training the trained model. Based on the updated algorithm container, the training component may update/(re)train the trained model. The updated trained model may be provided to the first computing environment. The test operating environment may be used to evaluate performance metrics for the updated trained model. The performance metrics for the trained model and the performance metrics for the updated trained model may then be compared to determine the which model (e.g., trained model or updated trained model) is more accurate. Based on the comparison, the most accurate model may be selected, and a newly updated algorithm container may be selected or obtained. The process may continue as described above until a set of performance metrics meeting or exceeding a threshold value/level is acquired, or until a defined set of criteria is met.

The methods 300 and 400 described below may be performed separately in each of the environments 201A, B and C. For example, method 300 for training an NLP-based model to generate images comprising labeled ROI may be performed asynchronously at each of the environments 201A, B and C. Similarly, method 400 may be performed at each environment 201A, B and C and the resulting trained model from each of those environments may be received at the environment 221. Each of the train models may be evaluated and compared against the metrics described and the performance compared against each other. Based on the comparison, the most accurate model may be selected, and a newly updated algorithm container may be selected or obtained.

Figure 5:
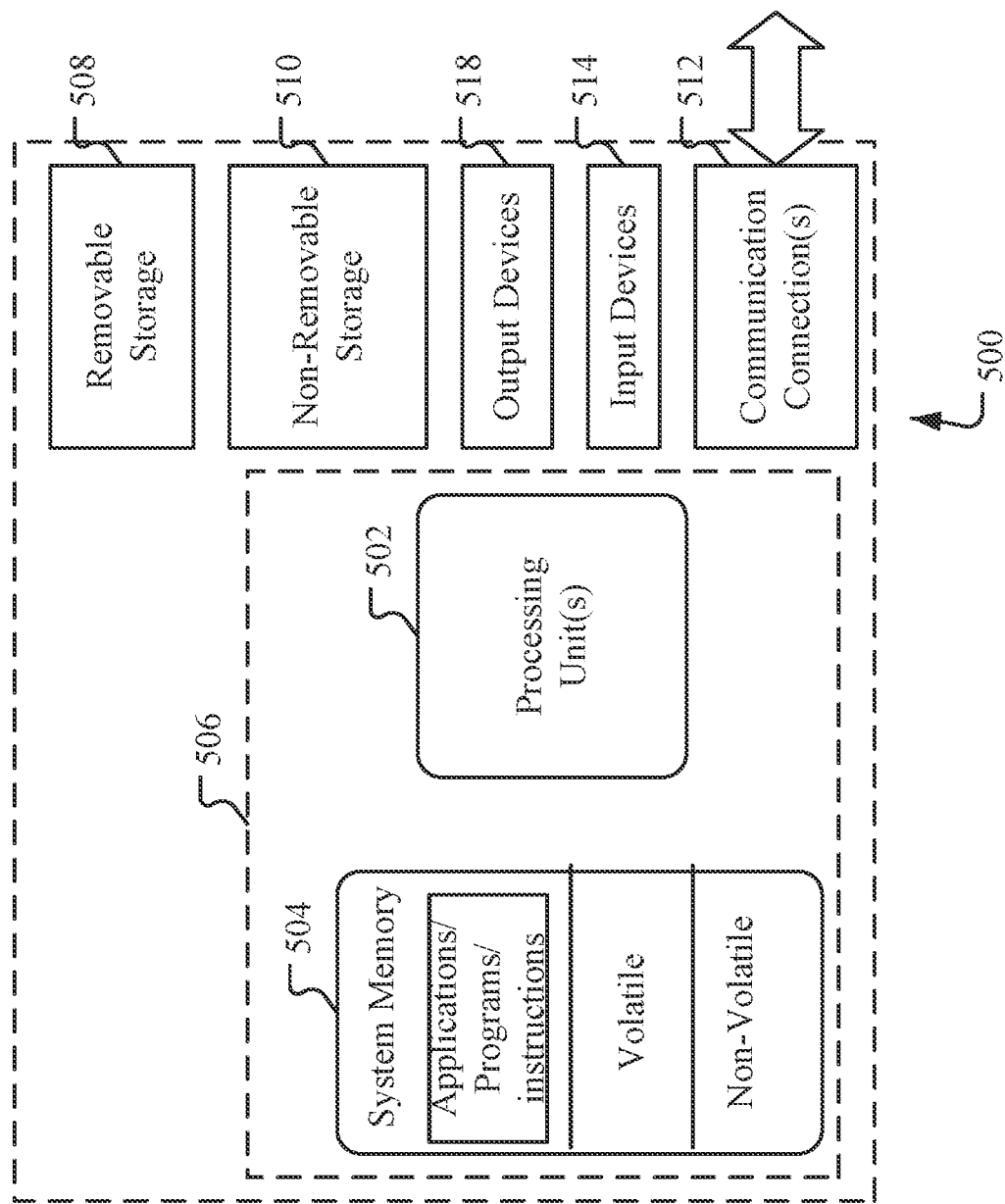
FIG. 5 illustrates one example of a suitable operating environment in which one or more of the present embodiments may be implemented.

FIG. 5 illustrates an exemplary suitable operating environment for the systems and methods for using AI to identify regions of interest (ROI) in medical images described in FIGS. 1 and 2. In its most basic configuration, operating environment 500 typically includes at least one processing unit 502 and memory 504. Depending on the exact configuration and type of computing device, memory 504 (storing, instructions to perform the techniques disclosed herein) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device (s) 514 such as keyboard, mouse, pen, voice input, etc. and/or output device(s) 516 such as a display, speakers, printer, etc. Also included in the environment may be one or more communication connections 512, such as LAN, WAN, point to point, etc. In embodiments, the connections may be operable to facility point-to-point communications, connection-oriented communications, connectionless communications, etc.

Operating environment 500 typically includes at least some form of computer readable media. Computer readable media can be any available media that can be accessed by processing unit 502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

Although specific embodiments are described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A system for using Artificial Intelligence (AI) to identify Regions of Interest (ROI) in medical images, the system comprising:
   a processor; and
   memory coupled to the processor, the memory comprising computer executable instructions that, when executed, perform a method comprising:
   receiving, by an application in a first environment, a request to train an algorithm to identify the ROI, the first environment being configured to implement a security procedure to enable a secure access to a second environment;
   providing, to the second environment, an algorithm container for the algorithm, wherein the algorithm container comprises one or more data objects for the algorithm, the second environment comprising at least one of a healthcare facility and protected health information;
   receiving a trained model from the second environment, wherein the trained model is based on the algorithm container; and
   evaluating performance metrics of the trained model using a test operating environment of the second environment.

2. The system of claim 1, wherein the first environment further includes a user interface allowing a user to identify an algorithm to be trained at the second environment.

3. The system of claim 2, wherein the first environment comprises a model repository configured to store multiple trained models, wherein the trained model is stored at the model repository and is accessible by the user.

4. The system of claim 1, wherein evaluating performance metrics further includes identifying performance metrics for the trained model and comparing the identified performance metrics to a set of baseline performance metrics.

5. The system of claim 1, wherein as the result of evaluating the trained model, an updated algorithm container is determined.

6. The system of claim 5, further comprising providing the trained model and the updated algorithm container to the second environment.

7. The system of claim 6, wherein the updated algorithm container comprises an updated set of parameters for training the trained model and the second environment is configured to update the trained model.

8. The system of claim 7, wherein the updated trained model is provided to the first environment.

9. The system of claim 1, wherein the request to train the algorithm includes a selection of the algorithm from a list of algorithms in an algorithm repository.

10. The system of claim 1, wherein the algorithm container is provided to the second environment in response to receiving the request to train the algorithm.

11. The system of claim 1, wherein providing the algorithm container comprises sending the algorithm container to one of an algorithm training orchestration component and an algorithm training component.

12. The system of claim 11, wherein the algorithm training orchestration component is configured to monitor an application component in the first environment.

13. The system of claim 12, wherein the application component comprises at least one of an application identifier, an application location, an application path, and access credentials to the application.

* * * * *